(12) United States Patent
Fujii et al.

(10) Patent No.: US 8,578,178 B2
(45) Date of Patent: Nov. 5, 2013

(54) STORAGE SYSTEM AND ITS MANAGEMENT METHOD

(75) Inventors: Tetsuhiko Fujii, Odawara (JP); Keiichi Tezuka, Totsuka (JP)

(73) Assignee: Hitachi, Ltd., Tokyo (JP)

( * ) Notice: Subject to any disclaimer, the term of this patent is extended or adjusted under 35 U.S.C. 154(b) by 74 days.

(21) Appl. No.: 13/320,149

(22) PCT Filed: Oct. 27, 2011

(86) PCT No.: PCT/JP2011/006018
§ 371 (c)(1),
(2), (4) Date: Nov. 11, 2011

(87) PCT Pub. No.: WO2013/061375
PCT Pub. Date: May 2, 2013

(65) Prior Publication Data
US 2013/0111221 A1    May 2, 2013

(51) Int. Cl.
*G06F 12/14* (2006.01)
(52) U.S. Cl.
USPC .......................................... 713/193; 711/100
(58) Field of Classification Search
USPC ......................................................... 713/193
See application file for complete search history.

(56) References Cited

U.S. PATENT DOCUMENTS

| | | | |
|---|---|---|---|
| 2006/0277386 A1* | 12/2006 | Eguchi | 711/170 |
| 2009/0049236 A1* | 2/2009 | Kinoshita | 711/112 |
| 2009/0169020 A1 | 7/2009 | Sakthikumar et al. | |
| 2010/0115049 A1 | 5/2010 | Matsunaga et al. | |
| 2011/0202765 A1 | 8/2011 | McGrane et al. | |

FOREIGN PATENT DOCUMENTS

| | | |
|---|---|---|
| EP | 1 357 465 A2 | 10/2003 |
| EP | 2 026 538 A1 | 2/2009 |
| JP | 2010-108409 A | 5/2010 |
| WO | 2008/037741 A1 | 4/2008 |

* cited by examiner

*Primary Examiner* — Nirav B Patel
(74) *Attorney, Agent, or Firm* — Volpe and Koenig, P.C.

(57) ABSTRACT

A plurality of storage devices with different functions and storage pools with different attributes are automatically associated with each other.

A controller: divides a plurality of storage devices into a first storage device(s) which has an encryption function and a second storage device(s) which does not have the encryption function; manages each storage device by associating it with encryption function information indicating whether the encryption function exists or not; manages a first storage pool with a first attribute and a second storage pool with a second attribute by using attribute information; manages a plurality of logical volumes by associating a first logical volume, to which a first physical volume belonging to the first storage pool is allocated, and a second logical volume, to which a second physical volume belonging to the second storage pool is allocated, with encryption attribute information indicating whether the encryption attribute exists or not; and allocating the first storage device(s) as the first physical volume to the first storage pool and the second storage device(s) as the second physical volume to the second storage pool on the basis of the encryption attribute information and the encryption function information.

12 Claims, 33 Drawing Sheets

FIG.3

| LOGICAL VOLUME NUMBER | ENCRYPTION ATTRIBUTE | ALLOCATED POOL NUMBER | OTHER MANAGEMENT INFORMATION |
|---|---|---|---|
| 001 | 1 | 1 | |
| 002 | 0 | 2 | |
| 003 | 0 | 1 | |

| POOL NUMBER 602 | ENCRYPTION ATTRIBUTE 604 | POINTER 606 | OTHER MANAGEMENT INFORMATION 608 |
|---|---|---|---|
| 1 | 1 | 2 | |
| 2 | 0 | 1 | |
| | | | |

| STORAGE DEVICE NUMBER | ENCRYPTION FUNCTION FLAG | OTHER MANAGEMENT INFORMATION |
|---|---|---|
| 101 | 0 | |
| 102 | 0 | |
| 103 | 1 | |

FIG.6

| STORAGE DEVICE NUMBER | ENCRYPTION FUNCTION FLAG | OTHER MANAGEMENT INFORMATION |
|---|---|---|
| 201 | 1 | |
| 202 | 1 | |
| | | |

FIG.7

| STORAGE DEVICE NUMBER | ALLOCATION STATUS | ENCRYPTION FUNCTION FLAG | OTHER ATTRIBUTE INFORMATION |
|---|---|---|---|
| 101 | ALLOCATED | 0 | |
| 102 | NOT ALLOCATED | 0 | |
| 201 | ALLOCATED | 1 | |
| 202 | NOT ALLOCATED | 1 | |

| 1002 | 1004 | 1006 | 1008 | 1010 | 1012 | 1014 |
|---|---|---|---|---|---|---|
| VM NUMBER | STORAGE IDENTIFIER | LOGICAL VOLUME IDENTIFIER | POLICY | MIGRATION FLAG | MIGRATION DESTINATION STORAGE IDENTIFIER | MIGRATION DESTINATION LOGICAL VOLUME IDENTIFIER |
| 1 | STORAGE 1 | 001 | ENCRYPTION REQUIRED | | | |
| 2 | STORAGE 1 | 002 | HIGH PERFORMANCE | | | |
| 3 | STORAGE 1 | 003 | EMPHASIS ON COST | | | |

FIG.16

| LOGICAL VOLUME NUMBER | LOGICAL VOLUME ATTRIBUTE | ALLOCATION STATUS |
|---|---|---|
| 001 | EQUIPPED WITH ENCRYPTION FUNCTION | ALLOCATED |
| 002 | HIGH PERFORMANCE | ALLOCATED |
| 003 | LOW COST | ALLOCATED |
| | | |

| LOGICAL VOLUME NUMBER | LOGICAL VOLUME ATTRIBUTE | ALLOCATION STATUS |
|---|---|---|
| A01 | HIGH PERFORMANCE | NOT ALLOCATED |
| A02 | LOW COST | NOT ALLOCATED |
| A03 | EQUIPPED WITH ENCRYPTION FUNCTION | NOT ALLOCATED |

FIG.21

| LOGICAL VOLUME NUMBER | LOGICAL VOLUME ATTRIBUTE | ALLOCATION STATUS | ENCRYPTION KEY IDENTIFIER |
|---|---|---|---|
| 001 | EQUIPPED WITH ENCRYPTION FUNCTION | ALLOCATED | 0001 |
| 002 | HIGH PERFORMANCE | ALLOCATED | |
| 003 | LOW COST | ALLOCATED | |

FIG. 22

| LOGICAL VOLUME NUMBER | LOGICAL VOLUME ATTRIBUTE | ALLOCATION STATUS | ENCRYPTION KEY IDENTIFIER |
|---|---|---|---|
| A01 | HIGH PERFORMANCE | NOT ALLOCATED | |
| A02 | LOW COST | NOT ALLOCATED | |
| A03 | EQUIPPED WITH ENCRYPTION FUNCTION | NOT ALLOCATED | |
| | | | |

FIG.30

| BLOCK ADDRESS | STORAGE AREA CATEGORY | STORAGE AREA ADDRESS | ENCRYPTION KEY |
|---|---|---|---|
| 0001 | MASTER DISK | ADDRESS INFORMATION 1 | COMMON KEY X |
| 0002 | DIFFERENCE AREA | ADDRESS INFORMATION 2 | VM1-SPECIFIC KEY Y |
| 0003 | DIFFERENCE AREA | ADDRESS INFORMATION 3 | VM1-SPECIFIC KEY Y |
| 0004 | MASTER DISK | ADDRESS INFORMATION 4 | COMMON KEY X |
| | | | |

FIG.31

| BLOCK ADDRESS | STORAGE AREA CATEGORY | STORAGE AREA ADDRESS | ENCRYPTION KEY |
|---|---|---|---|
| 0001 | MASTER DISK | ADDRESS INFORMATION 1 | COMMON KEY X |
| 0002 | DIFFERENCE AREA | ADDRESS INFORMATION 5 | VM2-SPECIFIC KEY Z |
| 0003 | MASTER DISK | ADDRESS INFORMATION 6 | COMMON KEY X |
| 0004 | DIFFERENCE AREA | ADDRESS INFORMATION 7 | VM2-SPECIFIC KEY Z |
| | | | |

FIG.32

| VM TYPE | VM IDENTIFIER | ENCRYPTION KEY |
|---|---|---|
| MASTER | A000 | X |
| INDIVIDUAL | A001 | Y |
| INDIVIDUAL | A002 | Z |

1802 / 1804 / 1806 / 1800

STORAGE SYSTEM AND ITS MANAGEMENT METHOD

TECHNICAL FIELD

The present invention relates to a storage system and its management method for managing storage areas of a plurality of storage devices with different functions as a virtualized storage area.

BACKGROUND ART

Regarding techniques relating to storage systems, for example, there is a storage virtualization technique for gathering one or more storage areas belonging to a plurality of storage apparatuses, forming and virtualizing them into one storage area, and providing the virtualized storage area to a host computer.

There is also a server virtualization technique for dividing one physical server into a plurality of virtual machines, allocating computer resources, such as a CPU (Central Processing Unit) and memory for the physical server, to each virtual machine, and having each virtual machine execute an OS (Operating System) and applications.

With the storage system using the server virtualization technique, a virtual machine may be sometimes relocated by migrating the virtual machine between different physical servers. For example, Patent Literature 1 describes that when migrating a virtual machine between different physical servers, the virtual machine is migrated in consideration of input to or output from an array group in the virtual machine after the migration.

CITATION LIST

Patent Literature

PTL 1: Japanese Patent Application Laid-Open (Kokai) Publication No. 2010-108409

SUMMARY OF INVENTION

Technical Problem

Recently, storage devices equipped with an encryption function capable of data encryption have been used in order to prevent leakage of personal information and confidential information due to theft or loss of storage media. If storage devices which have the encryption function and storage devices which do not have the encryption function are to be used in a storage system, it is necessary to manage each storage device depending on whether it has the encryption function or not.

For example, when storage pools to which physical storage areas of storage devices are allocated are to be constructed, it is necessary to construct the storage pools by distinguishing between a storage pool(s), to which physical storage areas of the storage devices having the encryption function are allocated, and a storage pool(s) to which physical storage areas of the storage devices not equipped with the encryption function are allocated.

However, the conventional technology does not give consideration to an attribute indicating whether the storage device has the encryption function or not. So, when constructing a storage pool, a worker has to judge whether the relevant storage device has the encryption function or not, based on configuration information of the storage device. Therefore, when constructing a storage pool, the worker has no choice but to manually design the configuration of the storage pool and allocation of the storage devices, which may be inefficient and possibly cause errors.

The conventional technology also does not give consideration to attributes of a virtual machine when migrating the virtual machine to another physical server. So, even when a virtual machine equipped with the encryption function is migrated to another physical server, the encryption function of the virtual machine cannot be utilized at the physical server which is a migration destination.

The present invention was devised in light of the problems of the conventional technology and it is an object of the invention to provide a storage system and its management method capable of automatically associating a plurality of storage devices having different functions with storage pools with different attributes.

Solution to Problem

In order to achieve the above-described object, the present invention is characterized in that a plurality of storage devices with different functions are distinguished according to the functions; each storage device is managed by associating it with function information for specifying the function of each storage device; a plurality of storage pools and a plurality of logical volumes are managed by associating them with attribute information indicating whether attributes exist or not; and when a physical volume is to be allocated to each storage pool, the physical volume to be allocated to the storage pool is determined based on the attribute information and the function information.

Advantageous Effects of Invention

According to the present invention, a plurality of storage devices with different functions can be automatically associated with storage pools with different attributes.

BRIEF DESCRIPTION OF DRAWINGS

FIG. 3 is a configuration diagram of a logical volume management table.

FIG. 4 is a configuration diagram of a pool management table.

FIG. 5 is a configuration diagram of a first pool-constituting storage device management table.

FIG. 6 is a configuration diagram of a second pool-constituting storage device management table.

FIG. 7 is a configuration diagram of a storage device management table.

FIG. 15 is a configuration diagram of a virtual machine management table.

FIG. 16 is a configuration diagram of a logical volume management table.

FIG. 17 is a configuration diagram of a logical volume management table.

FIG. 21 is a configuration diagram of a logical volume management table.

FIG. 22 is a configuration diagram of a logical volume management table.

FIG. 30 is a configuration diagram of a mapping table.

FIG. 31 is a configuration diagram of a mapping table.

FIG. 32 is a configuration diagram of an encryption key management table.

DESCRIPTION OF EMBODIMENTS

An embodiment of the present invention will be explained below with reference to the attached drawings.

First Embodiment

This embodiment is designed so that: a plurality of storage devices are managed by associating them with encryption function information indicating whether they are equipped with an encryption function or not; a plurality of storage pools and a plurality of logical volumes are managed by associating with encryption attribute information indicating whether they are equipped with an encryption attribute or not; and when allocating a physical volume to each storage pool, a physical storage area of storage devices, which have the encryption function, is allocated as a first physical volume to a first storage pool and a physical storage area of storage devices, which do not have the encryption function, is allocated as a second physical volume to a second storage pool on the basis of the encryption attribute information and the encryption function information.

Figure 1:
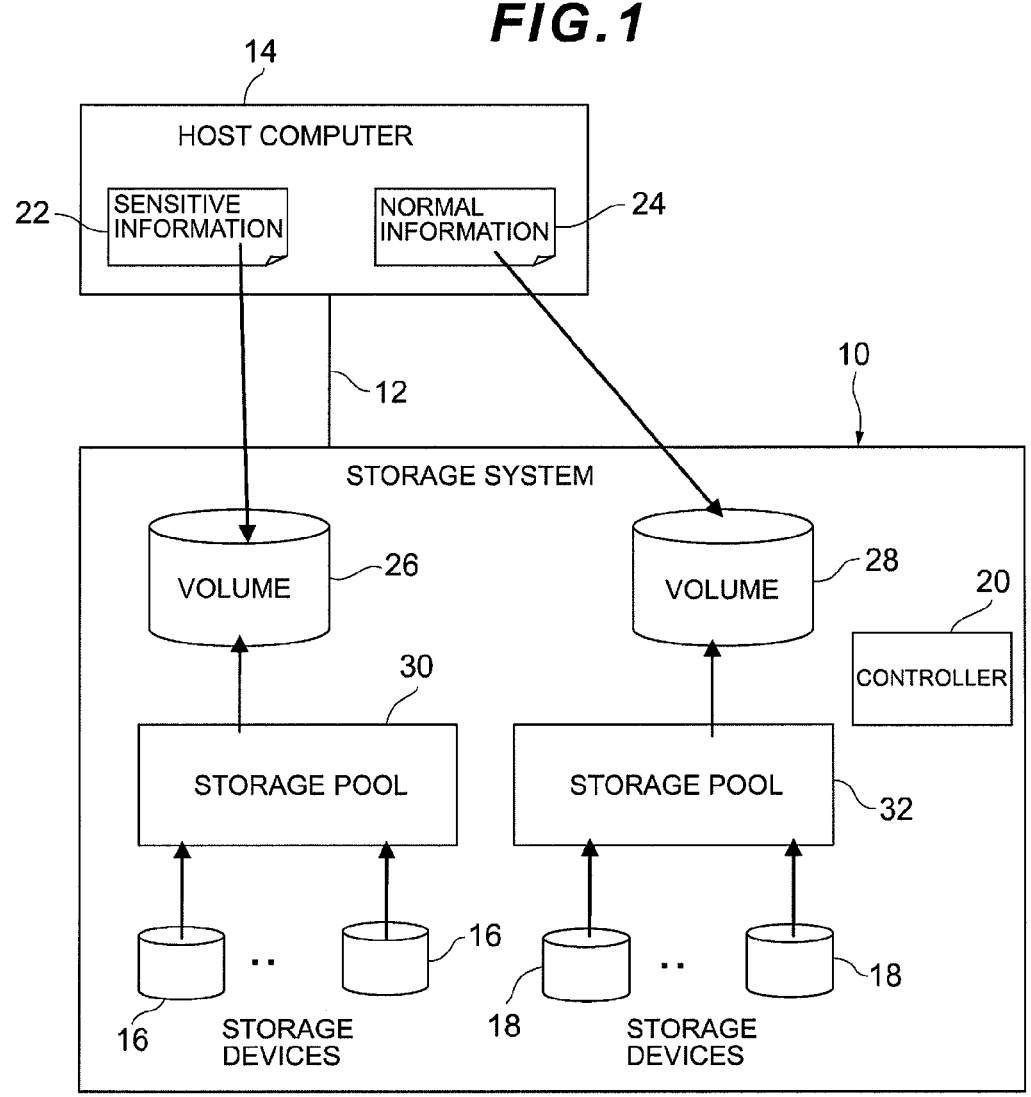
FIG. 1 is a conceptual diagram for explaining the concept of a first embodiment.

FIG. 1 shows a conceptual diagram for explaining the concept of a first embodiment.

Referring to FIG. 1, the computer system is constituted from a storage system 10, an I/O (Input/Output) interface 12, and a host computer (hereinafter sometimes referred to as the host) 14. The storage system 10 is connected via the I/O interface 12 to the host 14.

The storage system 10 is constituted from a plurality of storage devices (first storage devices) 16 which have an encryption function, a plurality of storage devices (second storage devices) 18 which do not have the encryption function, and a controller 20 for controlling data input to or output from each storage device 16, 18 and sending/receiving information to/from the host 14 via the I/O interface 12.

The host 14 is a computer device that manages sensitive information (for example, information which requires encryption) 22 and normal information (for example, information which does not require encryption) 26 and sends/receives information to/from the storage system 10; functions as a requestor for access to the storage system 10; and issues commands, including access requests, to the storage system 10.

In a memory (not shown) for the storage system 10, the following logical volumes and storage pools are constructed: a logical volume (first logical volume) 26 which is an access target of the host 14 and stores the sensitive information 22; a logical volume (second logical volume) 28 which is an access target of the host 14 and stores the normal information 26; a storage pool (first storage pool) 30 which is composed of a first physical volume and defined as a first attribute pool; and a storage pool (second storage pool) 32 which is composed of a second physical volume and defined as a second attribute pool.

Under this circumstance, the controller 20 is composed of, for example, a processor, manages the logical volume 26 and the storage pool 30 by associating them with each other, manages the logical volume 28 and the storage pool 32 by associating them with each other, and manages each storage device 16 and each storage device 18 by associating them with function information for specifying a function of each storage device 16, 18, for example, the function information indicating whether the encryption function exists or not.

The controller 20 also manages the storage pool 30 by associating it with the first attribute, for example, attribute information with the encryption attribute, and manages the storage pool 32 by associating it with the second attribute, for example, attribute information without the encryption attribute.

When allocating the first physical volume or the second physical volume to each storage pool 30, 32, the controller 20 allocates physical storage areas of the storage devices 16 equipped with the encryption function as the first physical volume to the storage pool 30 and allocates physical storage areas of the storage devices 18 not equipped with the encryption function as the second physical volume to the storage pool 32 on the basis of the attribute information for managing the storage pool 30, 32 and the function information for managing each storage device 16, 18.

As a result, the controller 20 constructs the storage pools 30, 32; and when allocating the storage devices to each storage pool 30, 32, the controller 20 can automatically allocate the physical storage areas of appropriate storage devices as the physical volumes to the storage pools 30, 32 on the basis of the function of each storage device 16, 18.

Furthermore, the controller 20 constructs the logical volumes 26, 28; and when allocating the physical volume to each logical volume 26, 28, the controller 20 can automatically allocate an appropriate physical volume from the storage pool whose attribute matches each logical volume 26, 28.

Figure 2:
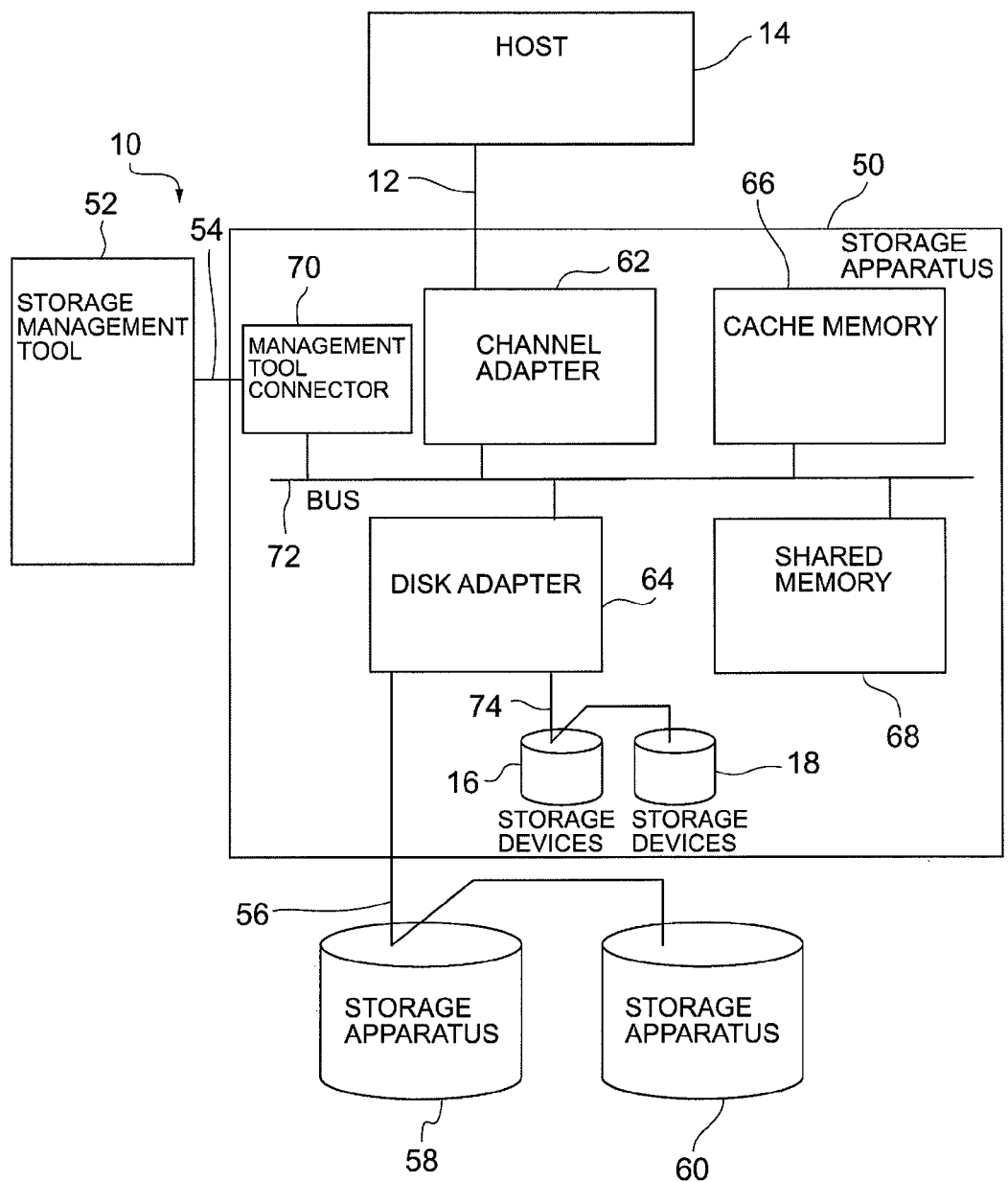
FIG. 2 is a configuration diagram of a computer system according to the first embodiment.

Next, FIG. 2 shows a configuration diagram of the computer system.

Referring to FIG. 2, the computer system is constituted form the storage system 10, the I/O interface 12, and the host 14; and the storage system 10 is constituted from a storage apparatus 50 and a storage management tool 52.

The storage system 10 is connected via the I/O interface 12 to the host 14. The storage apparatus 50 is connected via a network 54 to the storage management tool 52 and also via an I/O interface 56 to storage apparatuses 58, 60. The storage apparatus 58 is configured as a storage apparatus equipped with the encryption function and the storage apparatus 60 is configured as a storage apparatus not equipped with the encryption function.

The storage apparatus 50 is constituted from a channel adapter 62, a disk adapter 64, a cache memory 66, a shared memory 68, a management tool connector 70, and a plurality of storage devices 16, 18.

The channel adapter 62 is connected via the I/O interface 12 to the host 14 and also connected via a bus 72 to the disk adapter 64, the cache memory 66, the shared memory 68, and the management tool connector 70. The disk adapter 64 is connected via the I/O interface 56 to the storage apparatuses 58, 60 and also connected via an internal network 74 to the plurality of storage devices 16, 18.

The storage management tool 52 inputs, for example, setting information in accordance with operation by a user and sends the input information via the network 54 to the management tool connector 70. The management tool connector 70 transfers the input information via the bus 72 to the channel adapter 62, the disk adapter 64, the cache memory 66, and the shared memory 68.

The channel adapter 62 functions as a communications interface for sending/receiving commands and data (I/O data) to/from the host 14 via the I/O interface 12 and is constituted from, for example, a plurality of ports, a memory, and a microprocessor (any of which is not shown in the drawing).

Each port is connected via a network cable such as an optical fiber to the I/O interface 12 and each port is assigned a network address (for example, WWN). The host 14 can uniquely identify a specific port by using the network address.

The microprocessor performs protocol conversion of a data packet retained in a memory in the channel adapter 62 to remove, for example, a header from the data packet, fetches a command and data from the data packet, and writes the fetched command and data to the cache memory 66 via the bus 72. The microprocessor also encapsulates data stored in the cache memory 66 from the disk adapter 64 in accordance with specified protocol. When this happens, the microprocessor refers to the cache memory 66 periodically or at specified timing, fetches data, which it should process by itself, from the cache memory 66, and sends the fetched data to the host 14.

The disk adapter 64 functions as an I/O interface for controlling access to each storage device 16, 18 and is constituted from, for example, a plurality of I/F units, a microprocessor, and a memory (any of which is not shown in the drawing).

Each of the plurality of I/F units has a buffer memory within itself and is connected to an interface provided in each storage device 16, 18 via the internal network 74. If each storage device 16, 18 is composed of, for example, a disk device, each I/F unit is assigned a specified disk ID.

The microprocessor determines a logical volume to access based on a logical address in a command attached to I/O data and accesses the determined logical volume. The microprocessor refers to the cache memory 66 periodically or at specified timing, fetches I/O data, which it should process by itself, from the cache memory 66, and sends the fetched I/O data to the access target disk device.

The cache memory 66 is configured as a storage area for temporarily storing I/O data.

The shared memory 68 is configured as a storage area for storing, for example, table information about a plurality of tables shared by the channel adapter 62 and the disk adapter 64 and system configuration information of the storage apparatus 50.

Under this circumstance, the channel adapter 62 or the disk adapter 64 functions as the controller 20, constructs a plurality of logical volumes 26 and a plurality of logical volumes 28 in the memory, and also constructs the storage pool 30 and the storage pool 32.

In this case, the storage pool 30 is a pool composed of a first physical volume having the encryption function and defined as a first storage pool having the encryption attribute (first storage pool with a first attribute). The storage pool 32 is a pool composed of a second physical volume not having the encryption function and defined as a second storage pool not having the encryption attribute (second storage pool with a second attribute). Then, the storage pool 30 and the storage pool 32 are associated with encryption attribute information indicating whether the encryption attribute exists or not, and are managed by using, for example, a pool management table described later.

The logical volume 26 is a logical volume to which the first physical volume belonging to the storage pool 30 is allocated and which is defined as a first logical volume having the encryption attribute (first logical volume with the first attribute). The logical volume 28 is a logical volume to which the second physical volume belonging to the storage pool 32 is allocated and which is defined as a second logical volume not having the encryption attribute (second logical volume with the second attribute). Then, the logical volume 26 and the logical volume 28 are associated with encryption attribute information indicating whether the encryption attribute exists or not, and are managed by using, for example, a logical volume management table described later.

Furthermore, each storage device 16 is managed as the first storage device which has the encryption function. Each storage device 18 is managed as the second storage device which does not have the encryption function. Then, each storage device 16 and each storage device 18 are associated with the encryption function information indicating whether the encryption function exists or not and are managed by using, for example, a storage device management table described later. The encryption function herein used means a function encrypting or decoding data.

Incidentally, when the plurality of storage devices are distinguished according to an access function indicating whether an data access speed is high or low, storage devices of a high access speed can be managed as the first storage devices and storage devices of a low access speed can be managed as the second storage devices. Under this circumstance, a plurality of storage pools and a plurality of logical volumes can be managed by associating them with access speed attribute information indicating whether the access speed is high or low.

As each storage device 16, 18, for example, hard disk devices, semiconductor memory devices, optical disk devices, magneto-optical disk devices, magnetic tape devices, and flexible disk devices can be used. If the hard disk devices are to be used as the storage devices, for example, FC (Fibre Channel) disks, SCSI (Small Computer System Interface) disks, SATA (Serial ATA) disks, ATA (AT Attachment) disks, and SAS (Serial Attached SCSI) disks can be used.

If the semiconductor memory devices are to be used as the storage devices, for example, SSD (Solid State Drive) (flash memory), FeRAM (Ferroelectric Random Access Memory), MRAM (Magnetoresistive Random Access Memory), phase change memory (Ovonic Unified Memory), and RRAM (Resistance Random Access Memory) can be used.

Furthermore, each storage device 16, 18 can constitute a RAID (Redundant Array of Inexpensive Disks) group such as RAID4, RAID5, or RAID6 and each storage device 16, 18 can be divided into a plurality of RAID groups. Under this circumstance, a plurality of logical units (hereinafter referred to as LU [Logical Units]) or a plurality of logical volumes can be formed in a physical storage area of each storage device 16, 18.

The host 14 is, for example, a computer device equipped with information processing resources such as a CPU, a memory, and an I/O interface and is configured as, for example, a personal computer, a workstation, or a mainframe. The host 14 can access logical volumes provided by the storage apparatus 50 by issuing an access request designating the logical volumes, for example, a write request or a read request, to the storage apparatus 50.

Next, FIG. 3 shows a configuration diagram of a logical volume management table.

Referring to FIG. 3, the logical volume management table 500 is a table for managing the logical volume 26 and the logical volume 28; is constituted from a logical volume number field 502, an encryption attribute field 504, an allocated pool number field 506, and an other management information field 508; and is stored in the shared memory 68.

The logical volume number is a number for uniquely identifying the logical volume 26 or the logical volume 28. Each entry of the logical volume number field 502 stores, for example, "001," "002," or "003" as the logical volume number for identifying the logical volume 26 or the logical volume 28.

The encryption attribute is information for identifying whether or not the logical volume 26, 28 is a logical volume which has the encryption attribute. If the logical volume 26, 28 has the encryption attribute, each entry of the encryption attribute field 504 stores information "1"; and if the logical volume 26, 28 is a logical volume which does not have the encryption attribute, each entry of the encryption attribute field 504 stores information "0."

For example, If a logical volume "001" is the logical volume 26, an entry corresponding to this logical volume 26 stores information "1." Also, if a logical volume "002" is the logical volume 28, an entry corresponding to this logical volume stores information "0."

The allocated pool number is a number for identifying a storage pool from which a physical volume is allocated to the logical volume 26, 28. Each entry of the allocated pool number field 506 stores the number of a storage pool from which a physical volume is allocated to the logical volume 26, 28. For example, if the number of the storage pool 30 is #1 and the pool number of the storage pool 32 is #2, a first entry of the allocated pool number field 106 stores "1" and a second entry of the allocated pool number field 106 stores "2."

The other management information is information for specifying, for example, the capacity of the relevant logical volume.

Next, FIG. 4 shows a configuration diagram of a pool management table.

Referring to FIG. 4, the pool management table 600 is a table for managing the storage pool 30 and the storage pool 32; is constituted from a pool number field 602, an encryption attribute field 604, a pointer field 606, and an other management information field 608; and is stored in the shared memory 68.

The pool number is a number for uniquely identifying the storage pool 30 and the storage pool 32. Each entry of the pool number field 602 stores the number for identifying the storage pool 30 or the storage pool 32. For example, if the pool number of the storage pool 30 is #1, a first entry of the pool number field 602 stores "1." If the pool number of the storage pool 32 is #2, a second entry of the pool number field 202 stores "2."

The encryption attribute is information for identifying whether or not the storage pool 30, 32 is a storage pool which has the encryption attribute. If the storage pool 30, 32 has the encryption attribute, each entry of the encryption attribute field 604 stores information "1"; and if the storage pool 30, 32 does not have the encryption attribute, each entry of the encryption attribute field 604 stores information "0."

For example, an entry corresponding to the storage pool #1 30 stores information "1" and an entry corresponding to the storage pool #2 32 stores information "0."

The pointer is information for referring to a pool-constituting storage device management table described later. When referring to a pool-constituting storage device management table #1, each entry of the pointer field 606 stores information "1"; and when referring to a pool-constituting storage device management table #2, each entry of the pointer field 606 stores information "2."

The other management information is information about, for example, the capacity of the storage pool 30 or the storage pool 32.

Next, FIG. 5 shows a configuration diagram of a pool-constituting storage device management table.

Referring to FIG. 5, a pool-constituting storage device management table #1 700 is a table for managing the storage devices 18 allocated to the storage pool 32; is constituted from a storage device number field 702, an encryption function flag field 704, and an other management information field 706; and is stored in the shared memory 68.

The storage device number is a number for uniquely identifying the relevant storage device 18. Each entry of the storage device number field 702 stores, for example, "101," "102," or "103" as the number for identifying each storage device 18.

The encryption function flag is encryption function information indicating whether the encryption function exists or not. If a storage device which has the encryption function is used as the storage device, each entry of the encryption function flag field 704 stores "1"; and if a storage device which does not have the encryption function is used as the storage device, each entry of the encryption function flag field 704 stores "0."

The other management information is information such as the capacity and number of rotations of the storage device 18.

Next, FIG. 6 shows a configuration diagram of a pool-constituting storage device management table.

Referring to FIG. 6, a pool-constituting storage device management table #2 800 is a table for managing the storage devices 16 allocated to the storage pool 30; is constituted from a storage device number field 802, an encryption function flag field 804, and an other management information field 806; and is stored in the shared memory 68.

The storage device number is a number for uniquely identifying the relevant storage device 16. Each entry of the storage device number field 802 stores, for example, "201" or "202" as the number for identifying each storage device 16.

The encryption function flag is encryption function information indicating whether the encryption function exists or not. If a storage device which has the encryption function is used as the storage device, each entry of the encryption function flag field 804 stores "1"; and if a storage device which does not have the encryption function is used as the storage device, each entry of the encryption function flag field 804 stores "0."

The other management information is information such as the capacity and number of rotations of the storage device 16.

Next, FIG. 7 shows a configuration diagram of a storage device management table.

Referring to FIG. 7, a storage device management table 900 is a table for managing each storage device 16, 18; is constituted from a storage device number field 502, an allocation status field 504, an encryption function flag 506, and an other attribute information field 908; and is stored in the shared memory 68.

The storage device number is a number for uniquely identifying each storage device 16 or each storage device 18. Each entry of the storage device number field 902 stores, for example, "101," "102," "201," or "202" as the number for identifying each storage device 16, 18.

The allocation status is information indicating whether or not a physical storage area of the storage device 16 or the storage device 18 is allocated as a physical volume to the storage pool 30 or the storage pool 32.

If the physical storage area of the storage device 16 or the storage device 18 is allocated as a physical volume to the storage pool 30 or the storage pool 32, each entry of the allocation status field 904 stores information "Allocated"; and if the physical storage area of the storage device 16 or the storage device 18 is not allocated as a physical volume to the storage pool 30 or the storage pool 32, each entry of the allocation status field 904 stores information "Not Allocated."

The encryption function flag is encryption function information indicating whether the encryption function exists or not. If a storage device which has the encryption function is used as the storage device, each entry of the encryption function flag field 906 stores "1"; and if a storage device which does not have the encryption function is used as the storage device, each entry of the encryption function flag field 906 stores "0."

The other management information is information such as the capacity, number of rotations, and manufacturer name of the storage device 16, 18.

Figure 8:
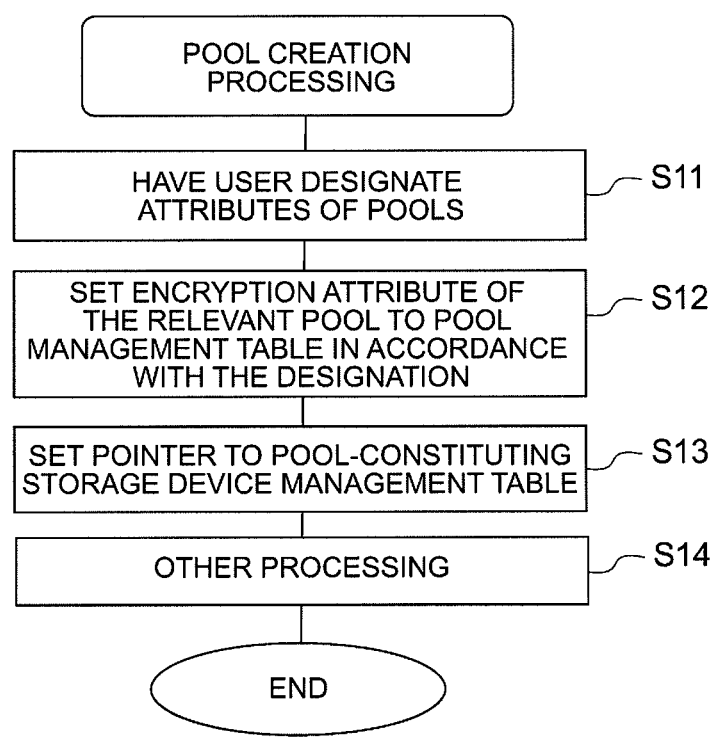
FIG. 8 is a flowchart for explaining pool creation processing.

Next, pool creation processing will be explained with reference to a flowchart in FIG. 8.

This processing is started by the user operating the storage management tool 52.

Firstly, the storage management tool 52 displays a screen for inputting attributes of storage pools (hereinafter sometimes referred to as the pools) in response to, for example, the operation by the user and has the user designate the attributes of the pools (S11). For example, the storage management tool 52 has the user designate the storage pool 30 as a pool, which has the encryption attribute, and designate the storage pool 32 as a pool which does not have the encryption attribute.

Next, the storage management tool 52 sets the encryption attribute of each pool to the pool management table 600 in accordance with the designation by the user (S12). For example, if the storage pool 30 is defined as the pool which has the encryption attribute, the storage management tool 52 sets "1" to a first entry of the encryption attribute field 604 in the pool management table 600.

Next, the storage management tool 52 sets the pointer to the pool-constituting storage device management table to the relevant entry of the pointer field 606 in the pool management table 600 (S13). For example, if it is necessary to refer to the pool-constituting storage device management table #2 800,
the storage management tool 52 sets "2" as the pointer to the pool-constituting storage device management table #2 800.

Subsequently, the storage management tool 52 executes processing other than the pool creation processing as other processing (S14) and then terminates the processing in this routine.

Figure 9:
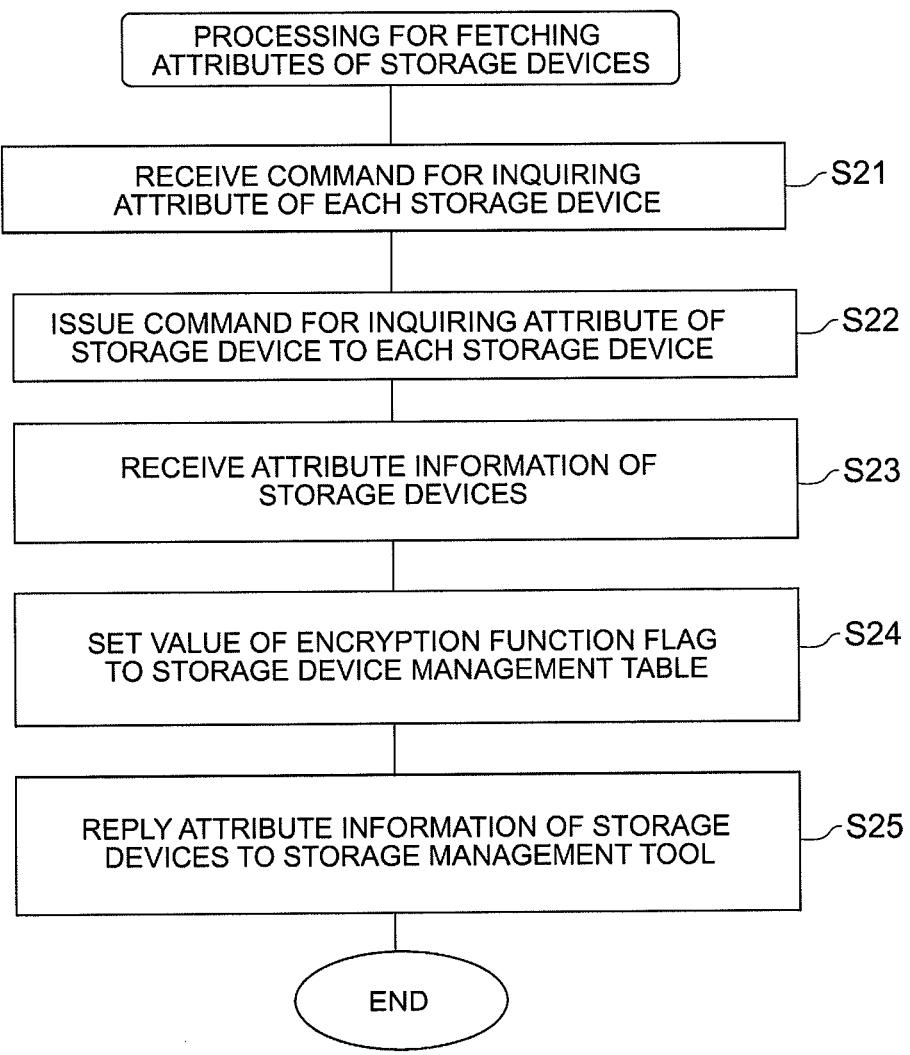
FIG. 9 is a flowchart for explaining processing for fetching attributes of storage devices.

Next, processing for fetching the attributes of the storage devices will be explained with reference to a flowchart in FIG. 9.

This processing is executed by the disk adapter 64 based on a command from the storage management tool 52.

Firstly, the storage management tool 52 issues a command for inquiring the attributes of the storage devices to the storage apparatus 50 via the network 54 in accordance with the operation by the user. Incidentally, regarding the inquiry about the attributes of the storage devices, a method of having the storage management tool (not shown) check with the management tool (not shown) of the storage devices can be also used.

Next, the disk adapter 64 for the storage apparatus 50 receives the command issued from the storage management tool 52 via the management tool connector 70 (S21).

The disk adapter 64 issues the received command to each storage device 16, 18 (S22). Under this circumstance, each storage device 16, 18 replies the attribute information indicating whether the encryption function exists or not, as the attribute information of each storage device 16, 18 to the disk adapter 64.

Subsequently, the disk adapter 64 receives the attribute information of each storage device 16, 18 from each storage device 16, 18 (S23).

Next, the disk adapter 64 searches the storage device management table 900 based on the received attribute information of each storage device 16, 18 and sets the encryption function flag, as the attribute information of each storage device 16, 18, to the relevant entry of the encryption function flag field 906 corresponding to each storage device 16, 18 (S24). In this case, "1" is set as the encryption function flag to the entry corresponding to the storage device 16 which has the encryption function; and "0" is set as the encryption function flag to the entry corresponding to the storage device 18 which does not have the encryption function.

Then, the disk adapter 64 replies the encryption function flag of each storage device 16, 18 as the attribute information of each storage device 16, 18 to the storage management tool 52 via the management tool connector 70 (S25) and then terminates the processing in this routine.

Figure 10:
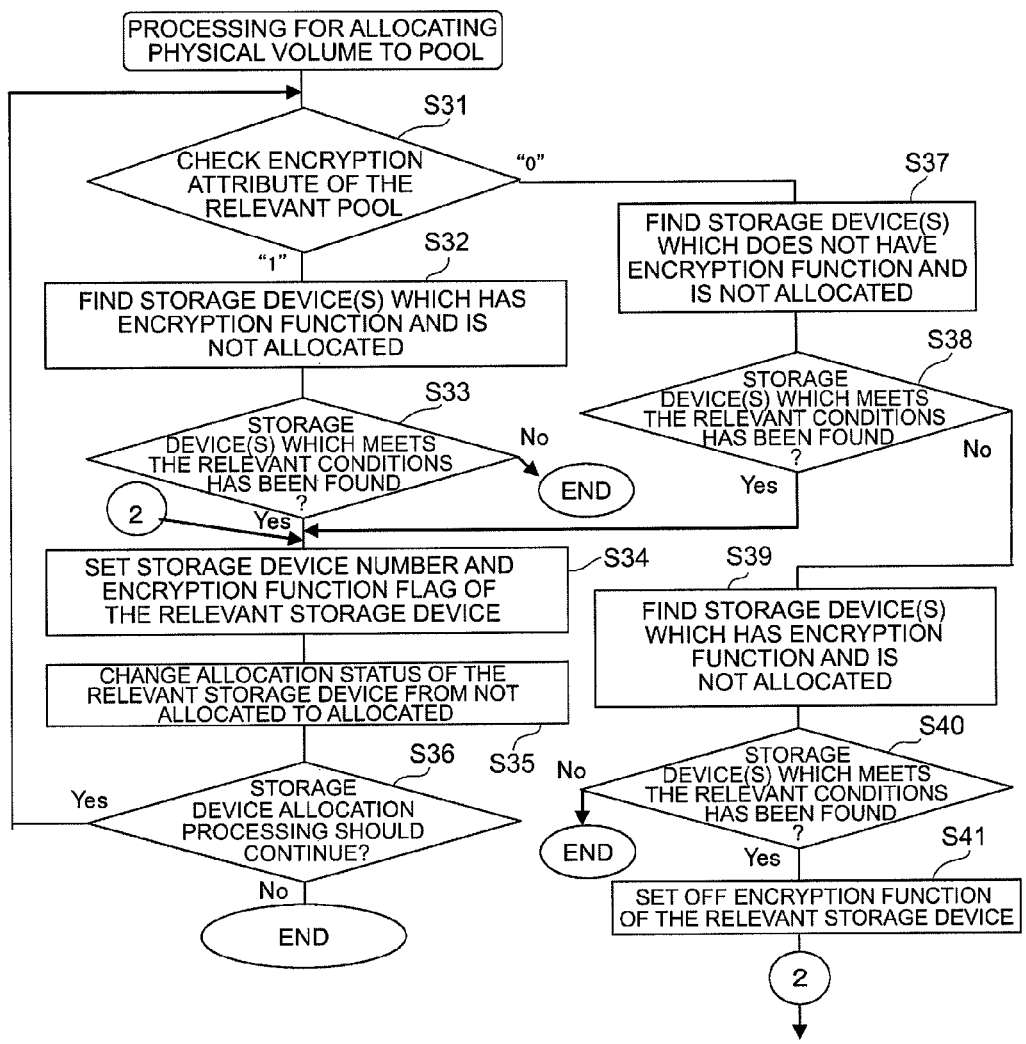
FIG. 10 is a flowchart for explaining processing for allocating physical volumes to pools.

Next, processing for allocating a physical volume to a pool will be explained with reference to a flowchart in FIG. 10.

This processing is started by, for example, the disk adapter 64.

Firstly, when allocating physical storage areas of the storage devices 16 as a first physical volume to the storage pool 30 or allocating physical storage areas of the storage devices 18 as a second physical volume to the storage pool 32, if the disk adapter 64 refers to the pool management table 600 and allocates the first physical volume to, for example, the storage pool 30, it checks the encryption attribute of a first entry of the pool management table 600 and judges whether or not the storage pool 30 is defined as a pool which has the encryption attribute (S31).

If it is determined in step S31 that the storage pool 30 is defined as the pool which has the encryption attribute, the disk adapter 64 executes processing for searching the storage device management table 900 and finding the storage device 16 regarding which "1" is set to the encryption function flag and which is not allocated (S32).

Next, the disk adapter 64 judges whether or not the storage device 16 which satisfies the relevant conditions has been found (S33); and if a negative judgment is returned in step S33, the disk adapter 64 terminates the processing in this routine.

On the other hand, if an affirmative judgment result (=1) is obtained in step S33, the disk adapter 64 refers to the pool-constituting storage device management table corresponding to the relevant pool, for example, the pool-constituting storage device management table #2 800 and sets the storage device number and encryption function flag of the storage device 16 found as a result of the search to the pool-constituting storage device management table #2 800 (S34).

For example, the disk adapter 64 sets "201" as the storage device number to a first entry of the storage device number field 802 and sets "1" to a first entry of the encryption function flag field 804 in the pool-constituting storage device management table #2 800.

Then, the disk adapter 64 refers to the storage device management table 900 and changes the allocation status in a third entry of the allocation status field 904 corresponding to the storage devices 16, which was found as a result of the search, from "Not Allocated" to "Allocated" (S35).

Subsequently, the disk adapter 64 judges whether the processing for allocating the storage device 16 should continue or not (S36). If it is determined in step S36 that the allocation processing should continue, the disk adapter 64 returns to the processing in step S31; and if it is determined in step S36 that the allocation processing should not continue, the disk adapter 64 terminates the processing in this routine.

On the other hand, if a negative judgment result (=0) is obtained step S31, that is, if it is determined that the relevant pool is the pool which does not have the encryption attribute, the disk adapter 64 executes processing for referring to the storage device management table 900 and finding the storage device 18 whose encryption function flag is "0" and whose allocation status is Not Allocated (S37).

Next, the disk adapter 64 judges whether or not the storage device 18 which satisfies the relevant conditions has been found (S38).

If an affirmative judgment is returned in step S38, the disk adapter 64 refers to the pool-constituting storage device management table #1 700 corresponding to the pool which does not have the encryption attribute, for example, the storage pool 32, and sets the storage device number and encryption function flag of the storage device 18, which does not have the encryption function, to the pool-constituting storage device management table #1 700 (S34).

For example, the disk adapter 64 sets "101" as the storage device number and "0" as the encryption function flag to a first entry of the pool-constituting storage device management table #1 700.

Next, the disk adapter 64 refers to the storage device management table 900 and changes the allocation status in the allocation status field 904 of the entry corresponding to the storage device 18 whose storage device number is "101" from "Not Allocated" to "Allocated" (S35).

Then, the disk adapter 64 judges whether the processing for allocating the storage device 18 should continue or not (S36). If it is determined in step S36 that the allocation processing should continue, the disk adapter 64 returns to the processing in step S31; and if it is determined in step S36 that the allocation processing should not continue, the disk adapter 64 terminates the processing in this routine.

Furthermore, if a negative judgment is returned in step S38, this means that the storage device 18 which satisfies the conditions does not exist among the storage devices 18 which do not have the encryption function. So, the disk adapter 64 executes processing for searching the storage device management table 900 and finding the storage device 16, whose encryption function flag is "1" and whose allocation status is "Not Allocated," as a substitute storage device for the storage device 18 (S39).

Next, the disk adapter 64 judges whether or not the storage device 16 which satisfies the relevant conditions has been found (S40). If the storage device 16 which satisfies the conditions is not found in step S40, the disk adapter 64 terminates the processing in this routine; and if the storage device 16 which satisfies the conditions is found in step S40, the disk adapter 64 proceeds to processing in step S41.

If an affirmative judgment is returned in step S40, the disk adapter 64 executes processing for setting off the encryption function of the storage device 16 which was found as a result of the search (S41), and then proceeds to processing in step S34.

Then, the disk adapter 64 sets the storage device number and the encryption function of the storage device 16, which was found as a result of the search, to the pool-constituting storage device management table #1 700 (S34). In this case, the encryption function is set off even though the relevant storage device is the storage device 16. So, "0" is set to the encryption function flag.

Next, the disk adapter 64 refers to the storage device management table 900 and changes the allocation status of the storage device 16, which was found for the use as a substitute as a result of the search, from "Not Allocated" to "Allocated" (S35).

Subsequently, the disk adapter 64 judges whether the processing for allocating the storage device 16 should continue or not (S36). If it is determined in step S36 that the allocation processing should continue, the disk adapter 64 returns to the processing in step S31; and if it is determined in step S36 that the allocation processing should not continue, the disk adapter 64 terminates the processing in this routine.

Figure 11:
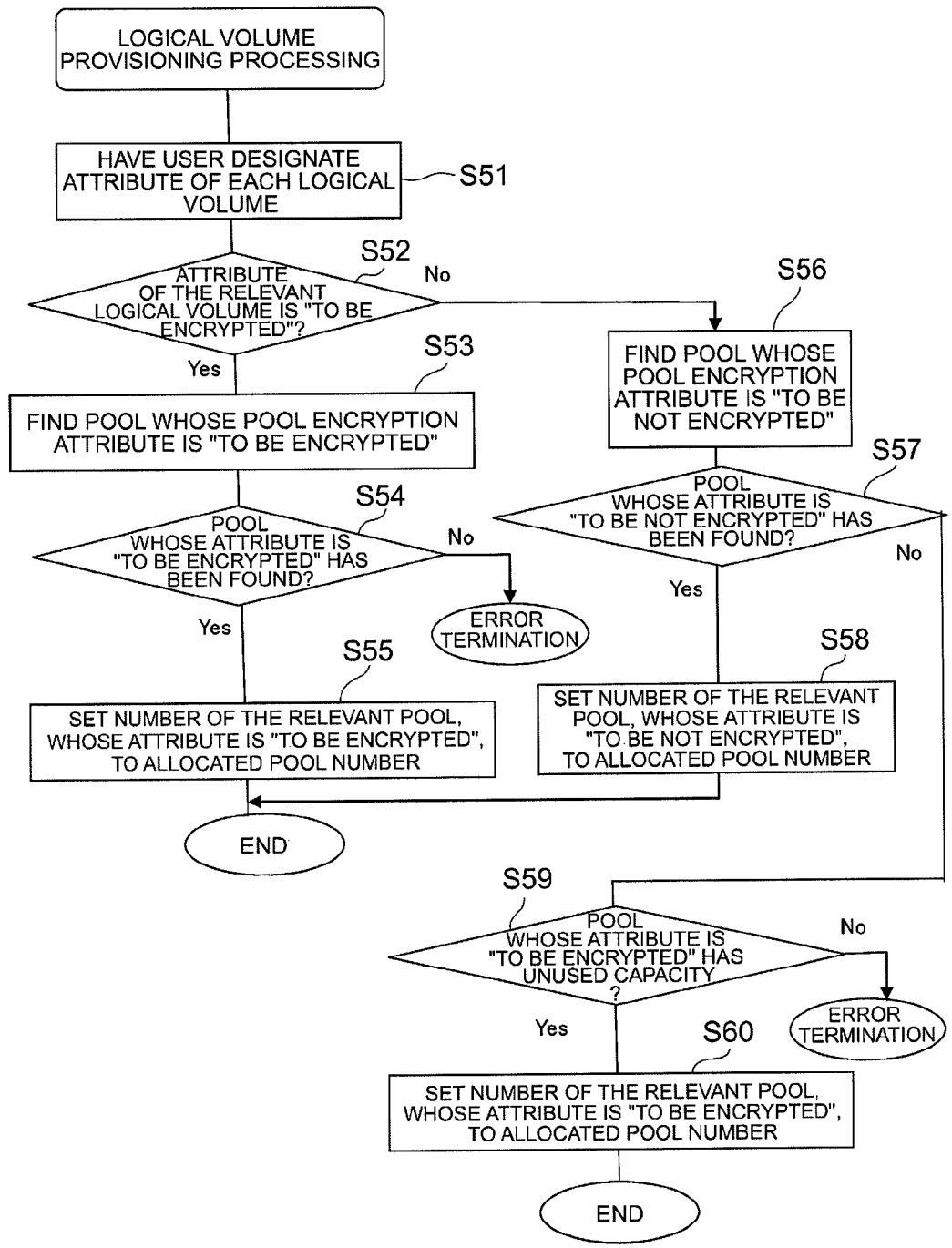
FIG. 11 is a flowchart for explaining logical volume provisioning processing.

Next, logical volume provisioning processing will be explained with reference to a flowchart in FIG. 11.

This processing is started by the disk adapter 64 based on a command from the storage management tool 52.

Firstly, the storage management tool 52 has the user designate the attribute of each logical volume (S51). For example, the storage management tool 52 displays a logical volume attribute input screen on its screen and has the user designate, for example, the attribute of the logical volume 26 or the logical volume 28 as the attribute of the logical volume.

If the attribute of the logical volume 26 is designated as a logical volume which has the encryption attribute, the designated information is sent as a command from the storage management tool 52 via the management tool connector 70 to the disk adapter 64.

Furthermore, if the logical volume 28 is designated as a logical volume which does not have the encryption attribute, the designated information is sent as a command from the storage management tool 52 via the management tool connector 70 to the disk adapter 64.

Next, the disk adapter 64 judges whether the attribute of the logical volume is to be encrypted (or has the encryption function) or not (S52).

If an affirmative judgment is returned in step S52, the disk adapter 64 executes processing for searching the pool management table 600 and finding the pool whose encryption attribute is "1" (S53).

Next, the disk adapter 64 judges whether the pool whose encryption attribute is "1" has been found or not (S54). If an affirmative judgment is returned in step S54, the disk adapter 64 refers to the logical volume management table 500, sets the pool number to the allocated pool number in the logical volume management table 500 (S55), and then terminates the processing in this routine.

For example, if the pool corresponding to the logical volume 26 is the storage pool 30 and the number of the storage pool 30 is "1," the disk adapter 64 sets "1" as the pool number to the allocated pool number in the logical volume management table 500. Incidentally, if a negative judgment is returned in step S54, the disk adapter 64 recognizes that the pool has not been created yet; and then terminates the processing in this routine.

On the other hand, if a negative judgment is returned in step S52, the disk adapter 64 executes processing for searching the pool management table 600 and finding the pool whose encryption attribute is to be not encrypted (the pool whose encryption attribute is "0") (S56) and judges whether the pool whose encryption attribute is "0" has been found or not (S57).

If an affirmative judgment is returned in step S57, the disk adapter 64 sets "2" as the number of the pool which does not have the encryption attribute to the allocated pool number in the logical volume management table 500 (S58) and then terminates the processing in this routine. In this case, since the storage pool 32 is defined as the pool which does not have the encryption attribute and the pool number of the storage pool 32 is "2," "2" is set to the allocated pool number.

On the other hand, if a negative judgment is returned in step S57, this means that the pool which does not have the encryption attribute does not exist. So, the disk adapter 64 judges whether the pool whose encryption attribute is "1" exists or not, as processing for searching for a substitute pool (S59).

If an affirmative judgment is returned in step S59, the disk adapter 64 sets the number of the storage pool 30, which was found as a result of the search, to the allocated pool number (S60) and then terminates the processing in this routine; and if a negative judgment is returned in step S59, the disk adapter 64 recognizes it as an error termination and then terminates the processing in this routine.

Figure 12:
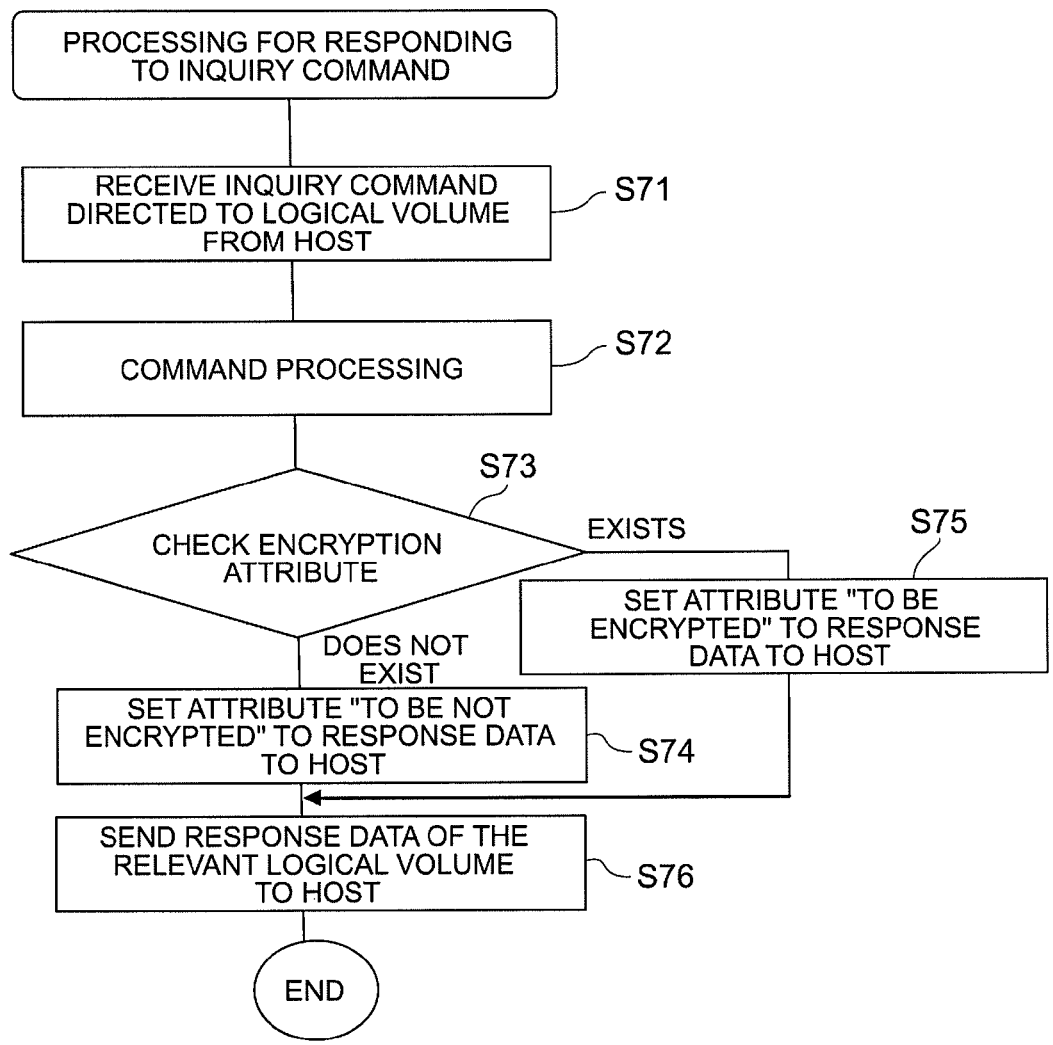
FIG. 12 is a flowchart for explaining processing for responding to an inquiry command.

Next, processing for responding to an inquiry command will be explained with reference to a flowchart in FIG. 12.

This processing is executed by the channel adapter 62 on condition that the storage apparatus 50 has received an inquiry command from the host 14.

Firstly, the channel adapter 62 receives a command including an LUN and a port number as an inquiry command from the host 14 to a logical volume (S71).

Next, the channel adapter 62 executes command processing based on the received command (S72).

Then, the channel adapter 62 refers to the logical volume management table 500 based on the inquiry command and checks the encryption attribute of the logical volume added to the inquiry command (S73). Specifically speaking, the channel adapter 62 judges whether or not the logical volume added to the inquiry command is a logical volume which has the encryption attribute.

If it is determined in step S73 that the logical volume is a logical volume which does not have the encryption attribute, for example, if the logical volume number of the logical volume added to the inquiry command is "002," the channel adapter 62 sets an attribute, indicating that the logical volume 28 is the logical volume which does not have the encryption attribute, to response data to the host 14 (S74).

If it is determined in step S73 that the logical volume is a logical volume which has the encryption attribute, for example, if the logical volume number of the logical volume added to the inquiry command is "001," the channel adapter 62 sets an attribute, indicating that the logical volume 26 is the logical volume which has the encryption attribute, to response data to the host 14 (S75).

Subsequently, the channel adapter 62 sends the response data including the attribute, which was set in step S74 or step S75, to the host 14 as processing after step S74 or step S75 (S76), and then terminates the processing in this routine.

According to this embodiment, a plurality of storage devices 16, 18 with different functions and the storage pools 30, 32 with different attributes can be automatically associated with each other. As a result, when constructing a virtualized storage system by using the plurality of storage devices 16, 18 with different functions, provisioning for allocating physical volumes to each storage pool can be executed efficiently and accurately.

Second Embodiment

This embodiment is designed so that if a virtual machine is selected as a migration target and an attribute is set to the selected virtual machine, a migration destination of the virtual machine, which is a migration target, is decided based on the attribute of the virtual machine.

Figure 13:
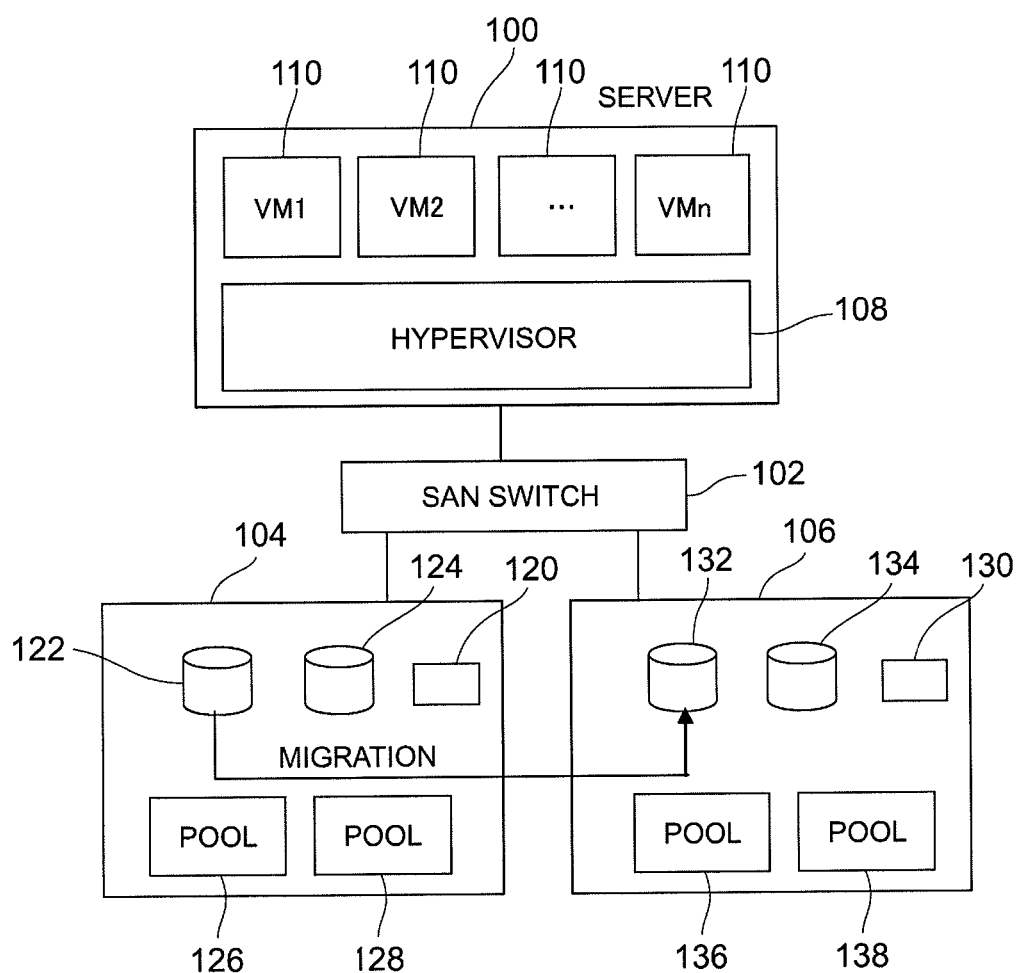
FIG. 13 is a conceptual diagram for explaining the concept of a second embodiment.

FIG. 13 shows a conceptual diagram of a second embodiment.

Referring to FIG. 13, the computer system is constituted from a server 100, a SAN (Storage Area Network) switch 102, a storage apparatus 104, and a storage apparatus 106; and the server 100 is connected via the SAN switch 102 to the storage apparatuses 104, 106, respectively.

The server 100 is constituted from a hypervisor 108 and a plurality of virtual machines (VM1, VM2, and so on up to VMn) 110 which operate on the hypervisor 108. The attribute of each virtual machine 110 such as "Equipped with Encryption Function," "High Performance," or "Low Cost" is defined for each virtual machine 110. Under this circumstance, the function of each machine obtained by virtually dividing one physical machine, including computer resources as a CPU and a memory, into a plurality of machines is added to each virtual machine.

The storage apparatus 104 is constituted from a controller 120 for supervising and controlling the entire storage apparatus 104, a plurality of storage devices 122, 124, and a plurality of storage pools 126, 128.

Each storage device 122, 124 is composed of a storage device with a function different from that of the other storage device. For example, the storage device 122 is a disk device which has the encryption function and is configured as a storage device for storing the virtual machine #1 110. The storage device 124 is a disk device which exhibits higher performance than that of the storage device 122 and is configured as a storage device for storing the virtual machine #2 110.

The storage pool 126 is a pool composed of a physical volume and is defined as a pool to which, for example, the virtual machine 110 stored in the storage device 122 having the encryption function is allocated as a physical volume, that is, a pool having the attribute equipped with the encryption function, from among the plurality of storage devices 122, 124 with different functions.

Under this circumstance, the virtual machine 110 which exists in the storage pool 126 is allocated to the logical volume having the attribute equipped with the encryption function (not shown).

The storage pool 128 is a pool composed of a physical volume and is defined as a pool to which, for example, the virtual machine 110 stored in the storage device 124 with high performance is allocated as a physical volume, that is, a pool having the attribute of high performance, from among the plurality of storage devices 122, 124 with different functions.

Under this circumstance, the virtual machine 110 which exists in the storage pool 128 is allocated to the logical volume having the attribute of high performance (not shown).

In this case, the controller 112 manages the correspondence relationship between the storage pools 126, 128 and the logical volume having the attribute equipped with the encryption function and the logical volume having the attribute of high performance based on the attribute of the virtual machine 110.

The storage apparatus 106 is constituted from a controller 130 for supervising and controlling the entire storage apparatus 106, a plurality of storage devices 132, 134, and a plurality of storage pools 136, 138.

Each storage device 132, 134 is composed of a storage device with a function different from that of the other storage device. For example, the storage device 132 is a disk device which has the encryption function and is composed as a storage device for storing the virtual machine #1 110. The storage device 134 is a disk device which exhibits higher performance than that of the storage device 132 and is composed of a storage device for storing the virtual machine #2 110.

The storage pool 136 is a pool composed of a physical volume and is defined as a pool to which, for example, the virtual machine 110 stored in the storage device 132 having the encryption function is allocated as a physical volume, that is, a pool having the attribute equipped with the encryption function, from among the plurality of storage devices 132, 134 with different functions.

Under this circumstance, the virtual machine 110 which exists in the storage pool 136 is allocated to the logical volume having the attribute equipped with the encryption function (not shown).

The storage pool 138 is a pool composed of a physical volume and is defined as a pool to which, for example, the virtual machine 110 stored in the storage device 134 with high performance is allocated as a physical volume, that is, a pool having the attribute of high performance, from among the plurality of storage devices 132, 134 with different functions.

Under this circumstance, the virtual machine 110 which exists in the storage pool 138 is allocated to the logical volume having the attribute of high performance (not shown).

In this case, the controller 112 manages the correspondence relationship between the storage pools 136, 138 and the logical volume having the attribute equipped with the encryption function and the logical volume having the attribute of high performance based on the attribute of the virtual machine 110.

Now, if migration is executed between the storage apparatus 104 and the storage apparatus 106 by setting the storage apparatus 104 as a migration source storage apparatus (hereinafter sometimes referred to as the migration source) and the storage apparatus 106 as a migration destination storage apparatus (hereinafter sometimes referred to as the migration destination), a controller which takes charge of the migration processing, from among the controllers 120, 130, for example, the controller 120, executes the migration processing. Incidentally, the management tool for managing the migration between the storage apparatus 104 and the storage apparatus 106 can also execute the migration processing.

For example, if the virtual machine (virtual machine #1) 110 stored in the storage device 122 is set as a migration target and the virtual machine #1 is migrated to the storage apparatus 106, the controller 120 determines a logical volume having the attribute equipped with the encryption function as a migration destination logical volume on the basis of the attribute of the virtual machine #1 110 and migrates the virtual machine #1 to the storage devices 132.

Since the virtual machine #1 110 is the virtual machine which has the encryption function in this case, the controller 130 manages the virtual machine 110, which has been migrated to the storage apparatus 106, as the virtual machine 110 which has the encryption function. Therefore, the virtual machine #1 110 is protected as the virtual machine which has the encryption function, also at the migration destination.

Figure 14:
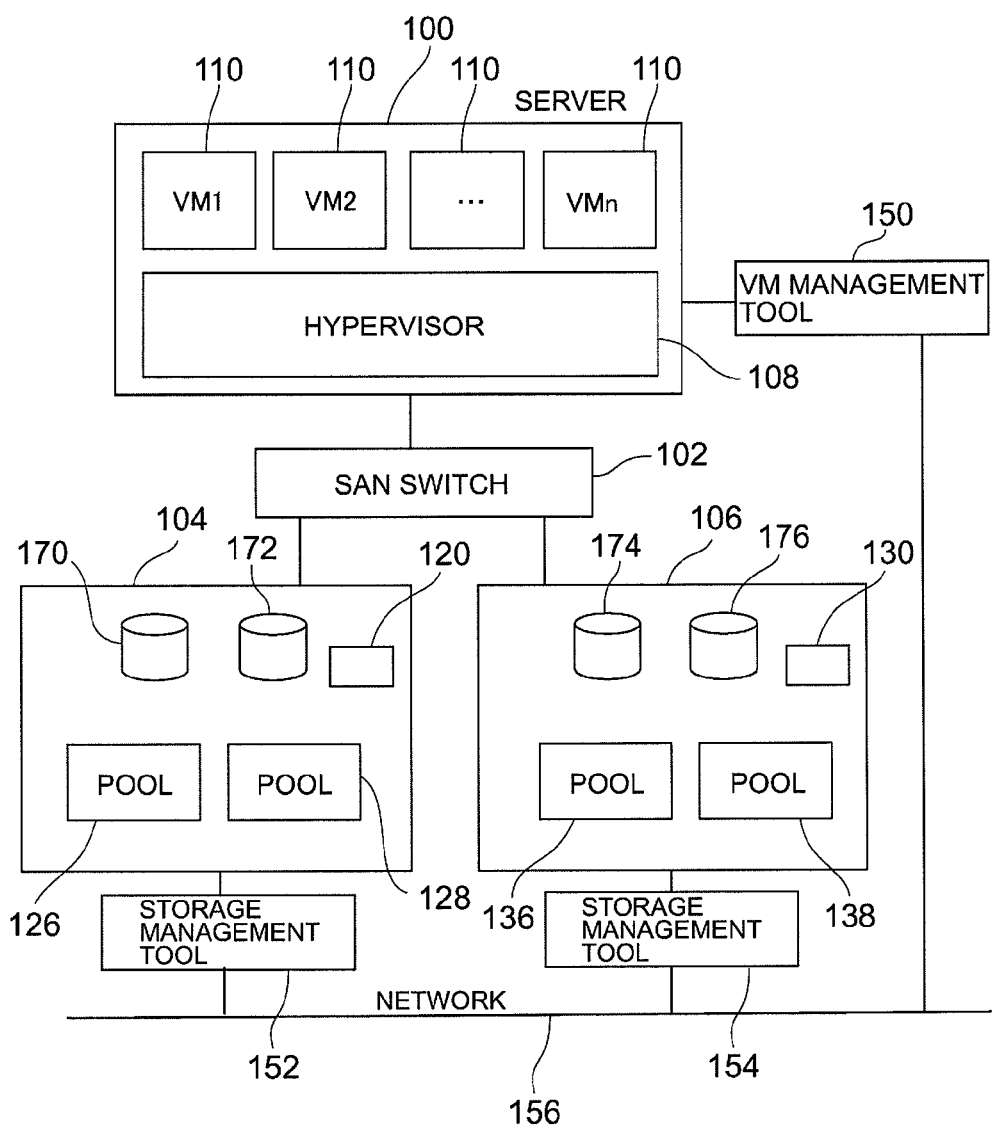
FIG. 14 is a configuration diagram of a computer system according to the second embodiment.

Next, FIG. 14 shows a configuration diagram of a computer system according to a second embodiment.

Referring to FIG. 14, the computer system is constituted from the server 100, the SAN switch 102, the storage apparatuses 104, 106, a virtual machine (VM) management tool 150, and storage management tools 152, 154.

The virtual machine management tool 150 is connected to the server 100 and also connected via a network 156 to the storage management tools 152, 154, respectively.

The virtual machine management tool 150 is a management device for managing each virtual machine 110 of the server 100 and also managing, for example, activation of migration between the storage apparatus 104 and the storage apparatus 106 based on a command from the server 100.

The storage management tool 152 is a management device connected to the storage apparatus 104 and the network 156 to manage logical volumes 170, 172, storage pools 126, 128, and a plurality of storage devices 122, 124 (not shown). Each storage device 122, 124 is configured as a VM storage disk.

Under this circumstance, the logical volume 170 is, for example, a logical volume having the attribute equipped with the encryption function and the virtual machine 110 which exists in the storage pool 126 is allocated to the logical volume 170. Furthermore, the logical volume 172 is, for example, a logical volume having the attribute of high performance and the virtual machine 110 which exists in the storage pool 128 is allocated to the logical volume 172.

The storage management tool 154 is a management tool connected to the storage apparatus 106 and the network 156 to manage logical volumes 174, 176, storage pools 136, 138, and a plurality of storage devices 132, 134 (not shown). Each storage device 132, 134 is configured as a VM storage disk.

Under this circumstance, the logical volume 174 is, for example, a logical volume having the attribute equipped with the encryption function and the virtual machine 110 which exists in the storage pool 136 is allocated to the logical volume 174. Furthermore, the logical volume 176 is, for example, a logical volume having the attribute of high performance and the virtual machine 110 which exists in the storage pool 138 is allocated to the logical volume 176.

Next, FIG. 15 shows a configuration diagram of a virtual machine management table.

Referring to FIG. 15, a virtual machine (VM) management table 1000 is a table for managing a plurality of virtual machines 110; is constituted from a VM (virtual machine) number field 1002, a storage identifier field 1004, a logical volume identifier field 1006, a policy field 1008, a migration flag field 1010, a migration destination storage identifier field 1012, and a migration destination logical volume identifier field 1014; and is located in the virtual machine management tool 150 and each storage management tool 152, 154.

The VM number is a number for identifying each virtual machine 110. Each entry of the VM number field 1002 stores, for example, "1," "2," or "3," as the number for identifying each virtual machine 110.

The storage identifier is an identifier for identifying a storage apparatus in which a VM storage disk (disk device) for storing the virtual machine 110 is located.

Each entry of the storage identifier field 1004 stores the identifier for identifying the storage apparatus 104, 106. For example, if the storage apparatus 104 is a storage apparatus #1 and the storage apparatus 106 is a storage apparatus #2, each entry of the storage identifier field 1004 stores "Storage 1" or "Storage 2."

The logical volume identifier is an identifier for identifying a logical volume to which the virtual machine 110 is allocated.

Each entry of the logical volume identifier field 1006 stores the identifier for identifying the logical volume 170, 172, 174, 176. For example, if the identifier of the logical volume 170 is "001," the relevant entry of the logical volume identifier field 1006 stores "001" as the identifier for identifying the logical volume 170.

The policy is information about a policy of the VM storage disk for storing each virtual machine 110.

Each entry of the policy field 1008 stores, as the policy of the VM storage disk, for example: "Encryption Required" if the VM storage disk storing the virtual machine 110 has the encryption function; "High Performance" if the performance of the VM storage disk storing the virtual machine 110 is high; or "Emphasis on Cost" if the emphasis is placed on the cost with respect to the VM storage disk storing the virtual machine 110.

The migration flag is information indicating whether or not the virtual machine 110 is being migrated by the migration processing. If the virtual machine 110 is being migrated, each entry of the migration flag field 1010 stores "ON"; and if the virtual machine 110 is not being migrated, each entry of the migration flag field 1010 stores "OFF."

The migration destination storage identifier is an identifier for identifying the virtual machine 110 which is the migration destination.

If the storage apparatus 106 is the migration destination storage apparatus, each entry of the migration destination storage identifier field 1012 stores "Storage Apparatus 2."

The migration destination logical volume identifier is an identifier for identifying the migration destination logical volume of the virtual machine 110.

For example, if the logical volume 170 is a migration source and the logical volume 174 is a migration destination, each entry of the migration destination logical volume identifier field 1014 stores the identifier for identifying the logical volume 174.

Next, FIG. 15 shows a configuration diagram of a logical volume management table.

Referring to FIG. 16, a logical volume management table 1100 is a table for managing the logical volumes 170, 172 in the storage apparatus 104; is constituted from a logical volume number field 1102, a logical volume attribute field 1104, and an allocation status field 1106; and is located in the storage apparatus 104 and the storage management tool 152.

The logical volume number is a number for uniquely identifying the logical volume 170, 172. Each entry of the logical volume number field 1102 stores, for example, "001," "002," or "003" as the logical volume number for identifying the logical volume 170, 172.

The logical volume attribute is information for identifying the attribute of the logical volume 170, 172.

Each entry of the logical volume attribute field 1104 stores, for example, "Equipped with Encryption Function," "High Performance," or "Low Cost" as information for identifying the attribute of the logical volume 170, 172.

The allocation status is information indicating whether the virtual machine 110 is allocated to the relevant logical volume or not. For example, if the virtual machine 110 is allocated to the logical volume 170, 172, each entry of the allocation status field 1106 stores "Allocated"; and if the virtual machine 110 is not allocated to the logical volume 170, 172, each entry of the allocation status field 1106 stores "Not Allocated."

Next, FIG. 17 shows a configuration diagram of another logical volume management table.

Referring to FIG. 17, a logical volume management table 1200 is a table for managing the logical volumes 174, 176 in the storage apparatus 106; is constituted from a logical volume number field 1202, a logical volume attribute field 1204, and an allocation status field 1206; and is located in the storage apparatus 106 and the storage management tool 154.

The logical volume number is a number for uniquely identifying the logical volume 174, 176. Each entry of the logical volume number field 1202 stores, for example, "A01," "A02," or "A03" as the logical volume number for identifying the logical volume 174, 176.

The logical volume attribute is information for identifying the attribute of the logical volume 174, 176.

Each entry of the logical volume attribute field 1204 stores, for example, "High Performance," "Low Cost," or "Equipped with Encryption Function" as information for identifying the attribute of the logical volume 174, 176.

The allocation status is information indicating whether the virtual machine 110 is allocated to the relevant logical volume or not. For example, if the virtual machine 110 is allocated to the logical volume 174, 176, each entry of the allocation status field 1206 stores "Allocated"; and if the virtual machine 110 is not allocated to the logical volume 174, 176, each entry of the allocation status field 1206 stores "Not Allocated."

Figure 18:
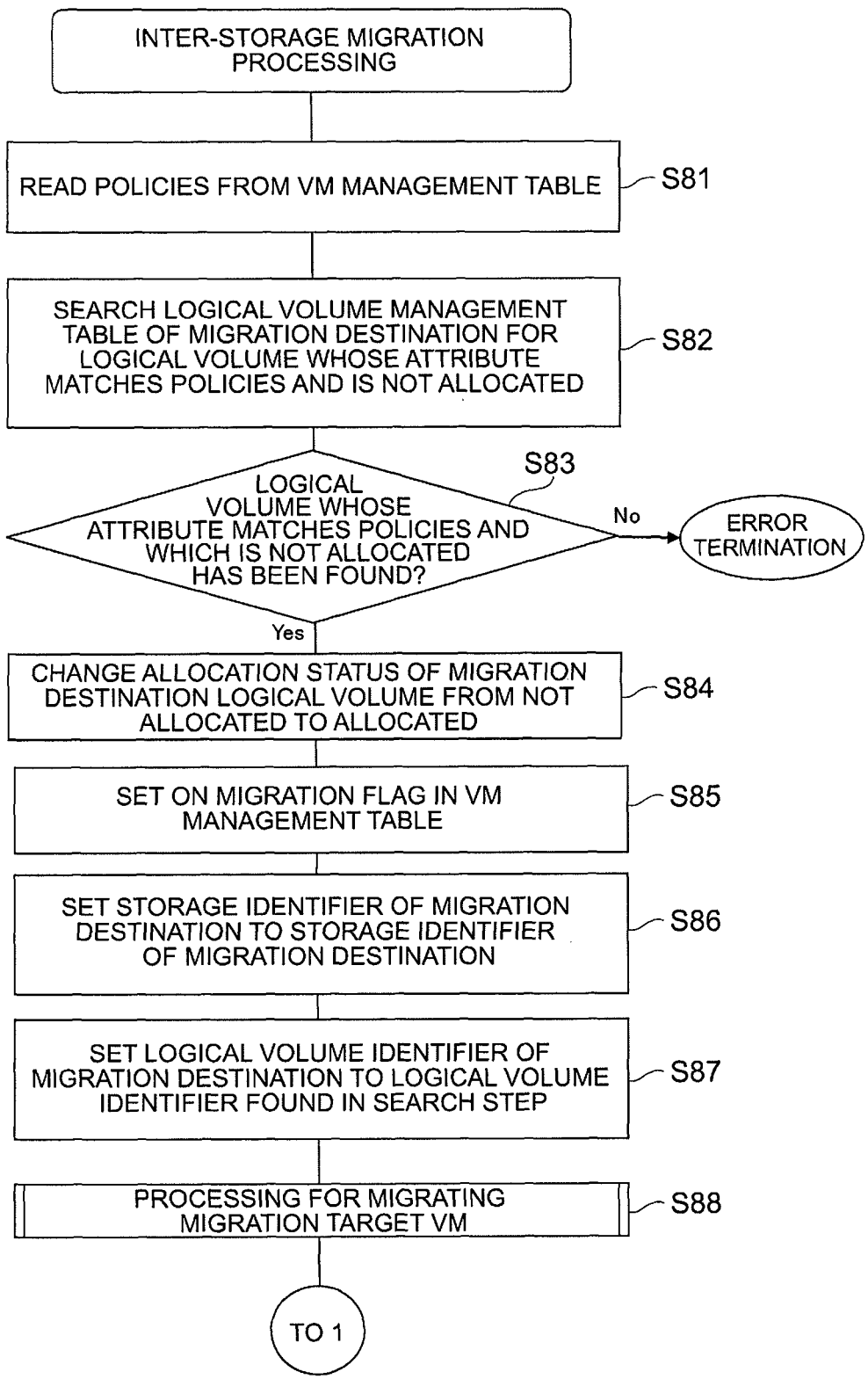
FIG. 18 is a flowchart for explaining inter-storage migration processing.
Figure 19:
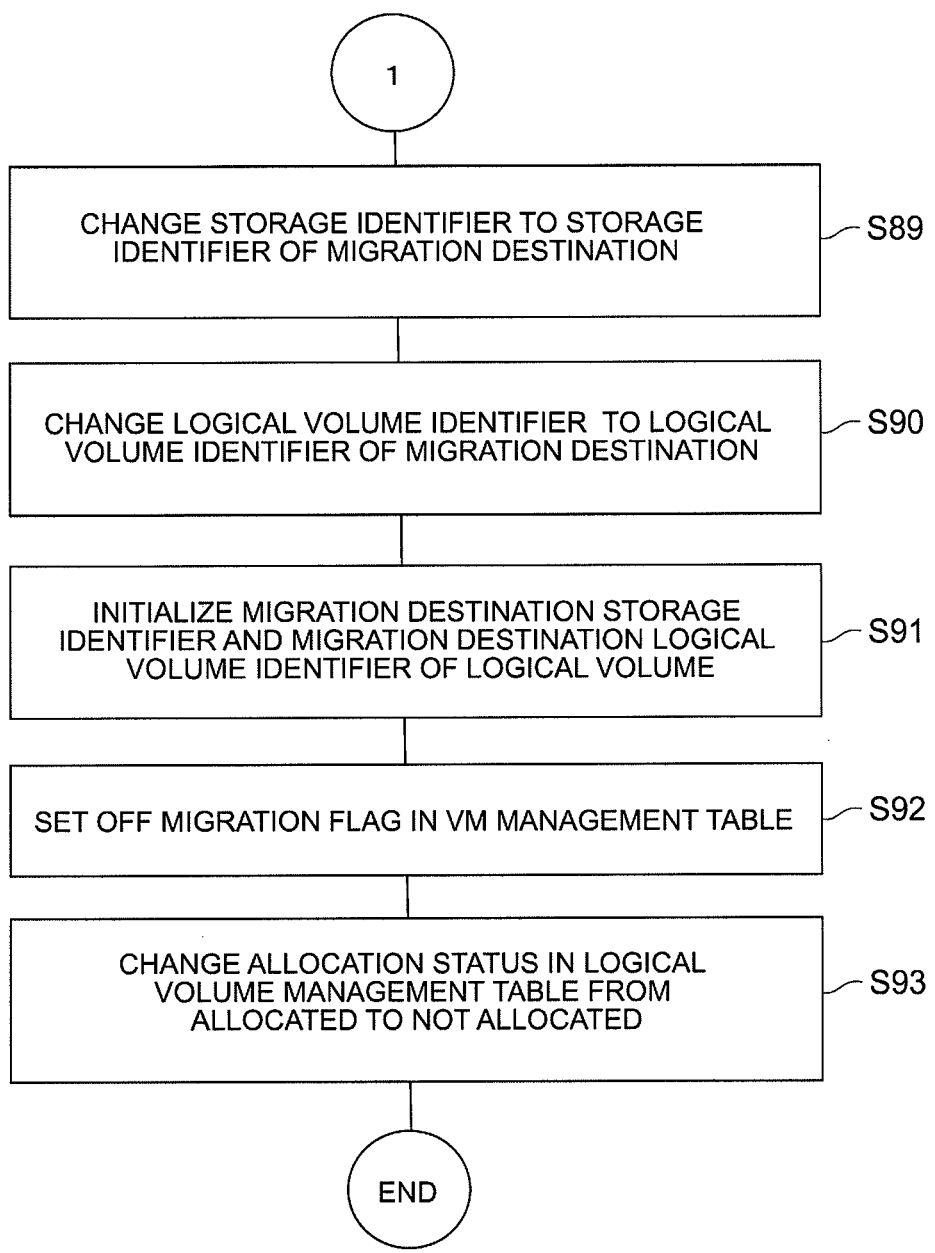
FIG. 19 is a flowchart for explaining the inter-storage migration processing.

Next, inter-storage migration processing will be explained with reference to flowcharts in FIG. 18 and FIG. 19.

This processing is started by the virtual machine management tool 150 when a request for the virtual machine management tool 150 to migrate the virtual machine 110 is issued from the server 100.

Firstly, when the virtual machine (virtual machine #1) 110 which is allocated to the logical volume 170 is a migration target, the virtual machine management tool 150 searches the virtual machine management table 1000 and reads "Encryption Required" as the policy from the virtual machine management table 1000 (S81).

Then, the virtual machine management tool 150 executes processing for referring to the logical volume management table 1200 in the migration destination storage apparatus 106 and searching for a logical volume whose logical volume attribute matches the policy of the VM storage disk and which is not allocated (S82).

Next, the virtual machine management tool 150 judges whether or not the logical volume whose attribute matches the policy and which is not allocated has been found (S83).

If a negative judgment is returned in step S83, it means that the logical volume whose attribute matches the policy and which is not allocated does not exist. So, the virtual machine management tool 150 recognizes it as an error termination and then terminates the processing in this routine.

On the other hand, if an affirmative judgment is returned in step S83, the virtual machine management tool 150 selects, for example, the logical volume 174 with the logical volume number="A03" as the logical volume whose attribute matching the policy "Encryption Required" of the VM storage disk is "Equipped with Encryption Function" and which is not allocated; manages the selected logical volume 174 as the migration destination logical volume of the virtual machine 110; and changes the allocation status of the migration destination logical volume 174 from "Not Allocated" to "Allocated" (S84).

Next, the virtual machine management tool 150 sets "ON" to a first entry of the migration flag field 1010 in the virtual machine management table 1000 with respect to the migration target virtual machine 110 (virtual machine #1 110) (S85).

Then, the virtual machine 150 sets "Storage 2" as the storage identifier of the migration destination storage apparatus 106 to the migration destination storage identifier in the virtual machine management table 1000 with respect to the migration target virtual machine 110 (S86).

Subsequently, the virtual machine management tool 150 sets "A03" as the identifier of the logical volume, which was obtained as a result of the search processing, to the migration destination logical volume identifier (S87).

Next, the virtual machine management tool 150 executes migration processing on the migration target virtual machine 110 (S88). For example, the virtual machine management tool 150 executes processing for migrating the virtual machine 110, which is allocated to the logical volume 170, to the logical volume 174.

Then, when the migration processing on the migration target virtual machine 110 has been completed, the virtual machine management tool 150 refers to the virtual machine management table 1000 with respect to the migration target virtual machine 110 and changes the storage identifier from the storage identifier of the migration source storage apparatus 104 to the identifier of the migration destination storage apparatus 106 (S89). For example, the virtual machine management tool 150 changes the storage identifier in the first entry of the virtual machine management table 1000 from "Storage 1" to "Storage 2."

Subsequently, the virtual machine management tool 150 changes the logical volume identifier of the migration target virtual machine 110 to the identifier of the logical volume 126 in the migration destination storage apparatus 106 (S90).

The virtual machine management tool 150 changes the logical volume identifier, for example, from "001" to "A03."

Next, the virtual machine management tool 150 initializes the migration destination storage identifier and the migration destination logical volume identifier with respect to the migration target virtual machine 110 (S91). For example, the virtual machine management tool 150 changes the migration destination identifier from "Storage 2" to "NULL" and changes the migration destination logical volume identifier from "A03" to "NULL."

Then, the virtual machine management tool 150 changes the migration flag with respect to the migration target virtual machine 110 from "ON" to "OFF" (S92).

Subsequently, the virtual machine management tool 150 refers to the logical volume management table 1100 with respect to the logical volume 170 in the migration source storage apparatus 104 and changes the allocation status from "Allocated" to "Not Allocated" (S93), and then terminates the processing in this routine.

Incidentally, the migration processing by the virtual machine management tool 150 can be executed also by the controller 120 or the controller 130.

According to this embodiment, the virtual machine 110 can be selected as the migration target; and if the attribute is set to the selected virtual machine 110, the migration destination of the virtual machine 110 which is the migration target can be determined based on the attribute of the virtual machine 110.

(Third Embodiment)

This embodiment is designed so that when encrypting a virtual machine, a specific key is used for each virtual machine as a key for encryption; and when migrating the virtual machine to another physical machine, the migration destination takes over the key which has been used by the migration source.

Figure 20:
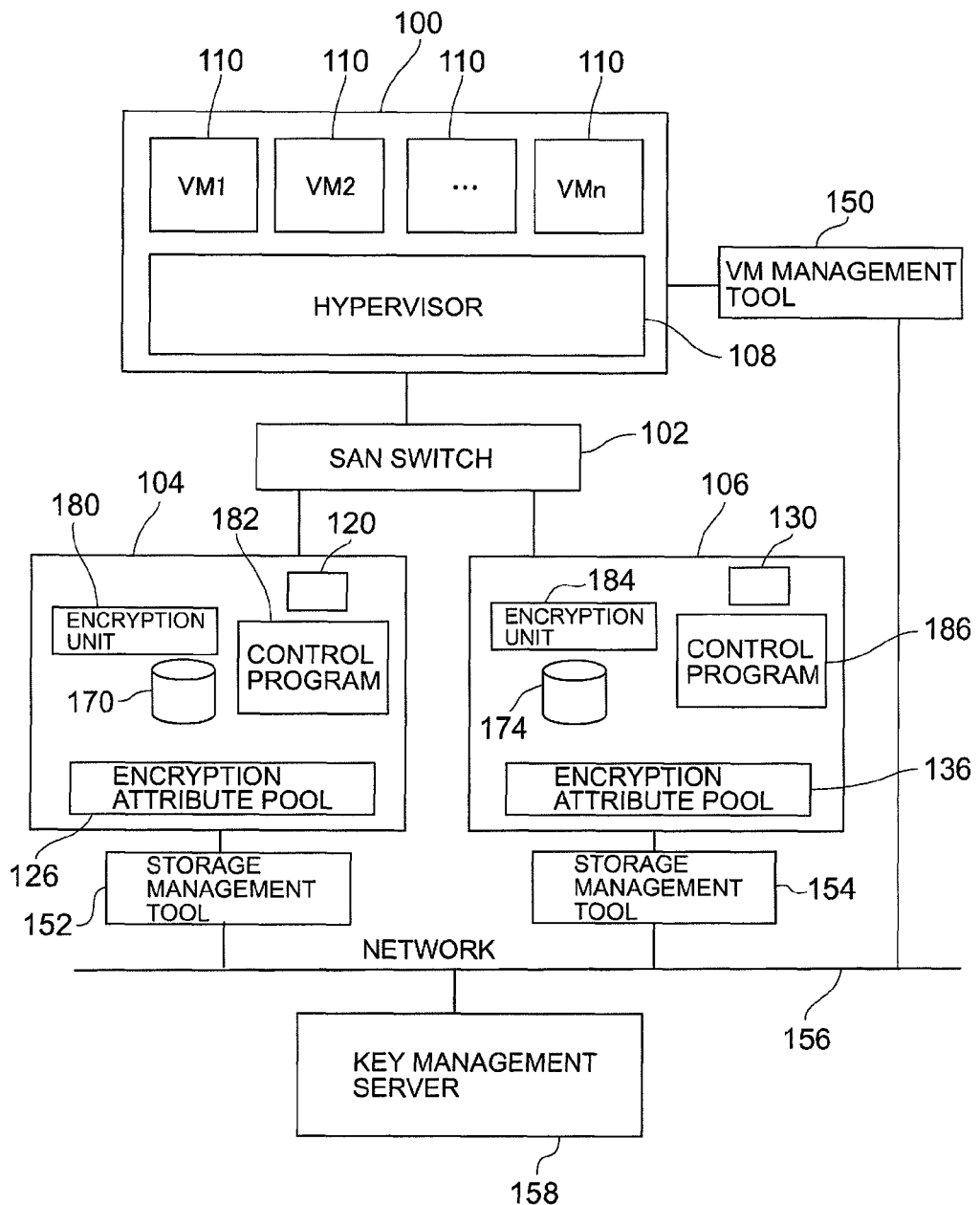
FIG. 20 is a configuration diagram of a computer system according to a third embodiment.

FIG. 20 shows a configuration diagram of a computer system according to a third embodiment.

Referring to FIG. 20, the computer system is constituted from the server 100, the SAN switch 102, the storage apparatuses 104, 106, the virtual machine management tool 150, the storage management tools 152, 154, and a key management server 158.

The server 100 is connected via the SAN switch 102 to the storage apparatuses 104, 106 and the storage apparatuses 104, 106 are connected to the storage management tools 152, 154, respectively. The virtual machine management tool 150 is connected to the server 100 and is also connected via the network 156 to the storage management tools 152, 154 and the key management server 158, respectively.

This embodiment is configured in the same manner as the second embodiment, except that: the key management server 158 is connected to the network 156; an encryption unit 180 and a control program 182 are located in the storage apparatus 104 and an encryption unit 184 and a control program 186 are located in the storage apparatus 106; and tables for managing the encryption keys and the logical volumes are located in the storage management tools 152, 154 and the key management server 158.

The encryption unit 180, 184 has a function encrypting or decoding data processed by the virtual machine 110.

The control program 182, 186 is a program activated by the controller 120 or the controller 130 and is used when the controller 120 or the controller 130 performs transmission/reception of information to/from the key management server 158.

Next, FIG. 21 shows a configuration diagram of a logical volume management table.

Referring to FIG. 21, a logical volume management table 1300 is a table for managing the logical volume 170 in the storage apparatus 104; is constituted from a logical volume number field 1302, a logical volume attribute field 1304, an allocation status field 1306, and an encryption key identifier field 1308; and is located in the storage apparatus 104 and the storage management tool 152.

The logical volume number is a number for uniquely identifying the logical volume 170. Each entry of the logical volume number field 1302 stores, for example, "001," "002," or "003" as the logical volume number for identifying the logical volume 170.

The logical volume attribute is information for identifying the attribute of the logical volume 170.

Each entry of the logical volume attribute field 1304 stores, for example, "Equipped with Encryption Function," "High Performance," or "Low Cost" as information for specifying the attribute of the logical volume 170.

The allocation status is information indicating whether the virtual machine 110 is allocated to the logical volume or not. For example, if the virtual machine 110 is allocated to the logical volume 170, each entry of the allocation status field 1306 stores "Allocated"; and when the virtual machine 110 is not allocated to the logical volume 170, each entry of the allocation status field 1306 stores "Not Allocated."

The encryption key identifier is an identifier for identifying the encryption key used for the logical volume 170. Each entry of the encryption key identifier field 1308 stores, for example, "0001" as the encryption key identifier used for the logical volume 170.

Next, FIG. 22 shows a configuration diagram of a logical volume management table.

Referring to FIG. 22, a logical volume management table 1400 is a table for managing the logical volume 174 in the storage apparatus 106; is constituted from a logical volume number field 1402, a logical volume attribute field 1404, an allocation status field 1406, and an encryption key identifier field 1408; and is located in the storage apparatus 106 and the storage management tool 154.

The logical volume number is a number for uniquely identifying the logical volume 174. Each entry of the logical volume number field 1402 stores, for example, "A01," "A02," or "A03" as the logical volume number for identifying the logical volume 174.

The logical volume attribute is information for identifying the attribute of the logical volume 174.

Each entry of the logical volume attribute field 1404 stores, for example, "High Performance," "Low Cost," or "Equipped with Encryption Function" as information for specifying the attribute of the logical volume 174.

The allocation status is information indicating whether the virtual machine 110 is allocated to the logical volume or not. For example, if the virtual machine 110 is allocated to the logical volume 174, each entry of the allocation status field 1406 stores "Allocated"; and when the virtual machine 110 is not allocated to the logical volume 174, each entry of the allocation status field 1406 stores "Not Allocated."

The encryption key identifier is an identifier for identifying the encryption key used for the logical volume 174. Each entry of the encryption key identifier field 1408 stores the encryption key identifier used for the logical volume 174.

Figure 23:
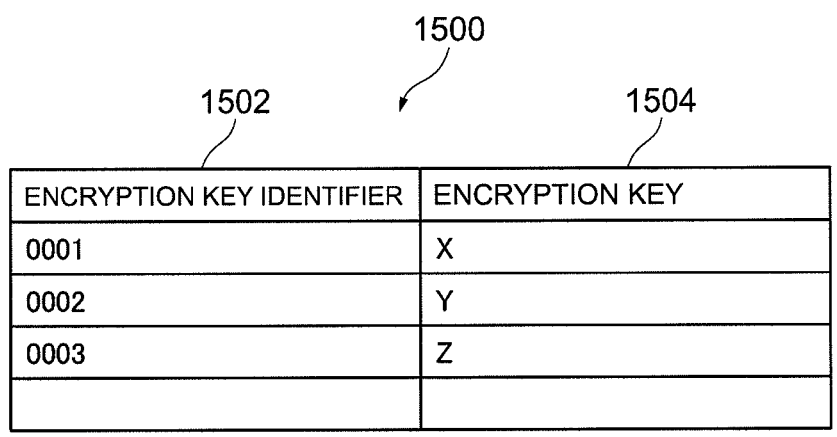
FIG. 23 is a configuration diagram of an encryption key management table.

Next, FIG. 23 shows a configuration diagram of an encryption key management table.

Referring to FIG. 23, an encryption key management table 1500 is a table for managing the encryption key used for each logical volume in the key management server 158; is constituted from an encryption key identifier field 1502 and an encryption key field 1504; and is located in the key management server 158.

The encryption key identifier is an identifier for identifying the encryption key used for the logical volume.

Each entry of the encryption key identifier field 1502 stores, for example, "0001," "0002," or "0003" as the encryption key identifier used for the logical volume.

The encryption key is information for specifying the encryption key used for each logical volume 170, 174. Each entry of the encryption key field 1504 stores, for example, "X," "Y," or "Z" as information indicating the encryption key.

Next, processing for migrating a virtual machine, which has the encryption function, between the storage apparatuses will be explained with reference to a flowchart in FIG. 24.

This processing is started by the virtual machine management tool 150 on condition that a request to migrate the virtual machine 110, which has the encryption function, between the storage apparatuses, for example, a request to migrate a virtual machine operating on a physical machine, which exists in the migration source storage apparatus, to a physical machine, which exists in the migration destination storage apparatus, is issued from the server 100 to the virtual machine management tool 150.

Firstly, when the virtual machine management tool 150 receives a migration request from the server 100, it checks with the storage management tool 152 for managing the migration source storage apparatus 104 and inquires about the encryption key identifier of the virtual machine 110 which is a migration target (S101).

In this case, if the storage management tool 152 searches the logical volume management table 1300 and the logical volume 170 whose logical volume number is "001" is a migration source logical volume, it sends the encryption key identifier "0001" via the network 140 to the virtual machine management tool 134.

Next, the virtual machine management tool 150 sends the encryption key identifier "0001" obtained from the storage management tool 152 to the storage management tool 154 for managing the migration destination storage apparatus 106 and invokes Processing A (S102). Under this circumstance, the storage management tool 154 manages the received encryption key identifier as the encryption key identifier used when encrypting data of the logical volume 174, and executes the encryption key setting processing A.

After the execution of the encryption key setting processing A by the storage management tool 154, the virtual machine management tool 150 executes processing for migrating the migration target virtual machine 110 (S103). Then, on condition that the processing for migrating the migration target virtual machine has been completed, the virtual machine management tool 150 refers to the logical volume management table 1300 in the migration source storage apparatus 104, invokes Processing B to initialize the encryption key identifier of the logical volume number "001" (S104), and then terminates the processing in this routine.

Next, the processing content of the encryption key setting processing A will be explained with reference to a flowchart in FIG. 25.

Figure 24:
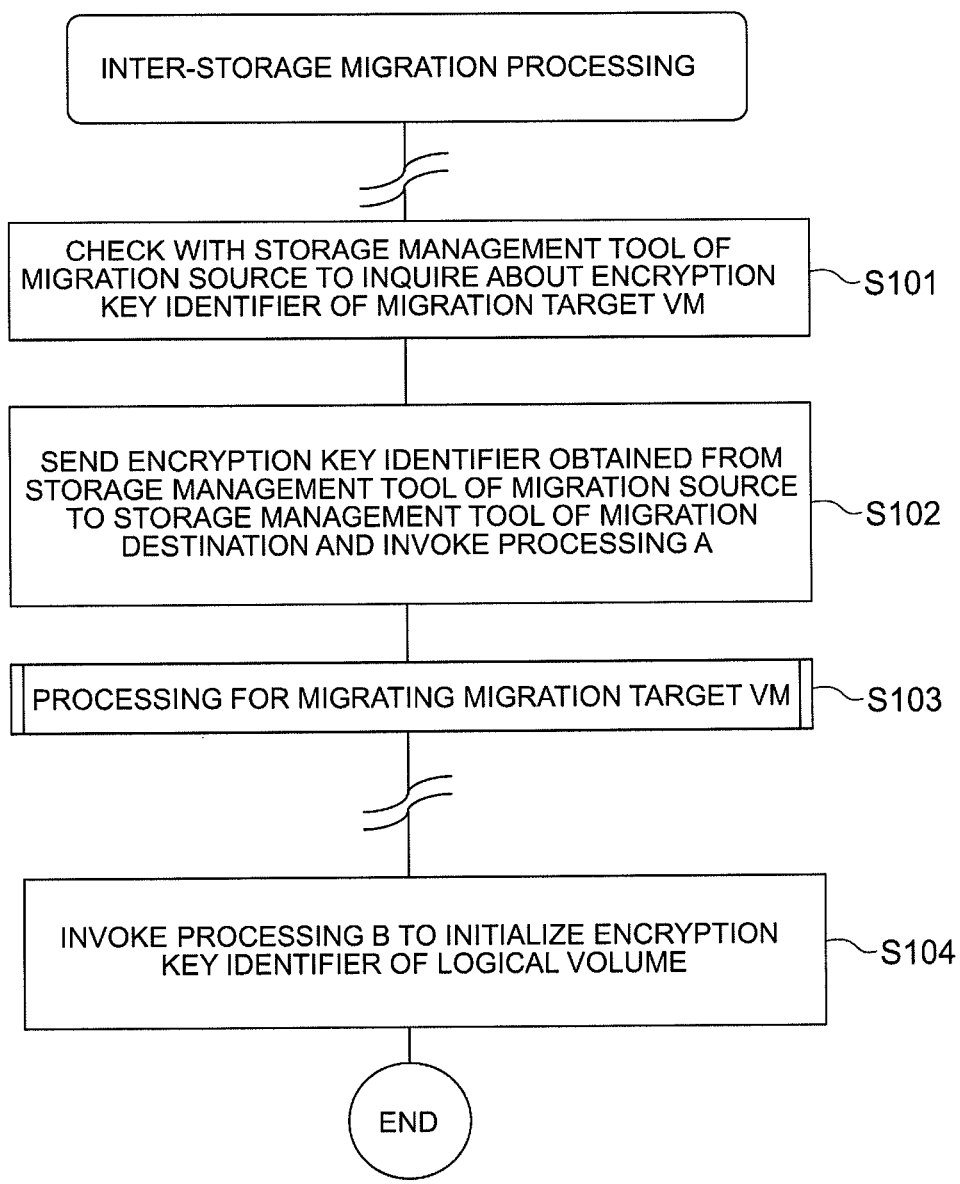
FIG. 24 is a flowchart for explaining inter-storage migration processing.

This processing is the processing invoked in step S102 in FIG. 24 and is started by the storage management tool 154.

The storage management tool 154 receives the encryption key identifier "0001" of the logical volume which is the migration target (S111).

Then, the storage management tool 154 sends the received encryption key identifier "0001" via the network 156 to the key management server 158 and receives an encryption key "X" corresponding to the encryption key identifier "0001" from the key management server 158 (S112).

Subsequently, the storage management tool 154 sends the encryption key "X," which was received from the key management server 158, to the control program 186 for the storage apparatus 106, which is a management target, issues an instruction to use the encryption key "X" to encrypt data of the logical volume 174, invokes Processing C (S113), and returns to the previous processing.

Figure 26:
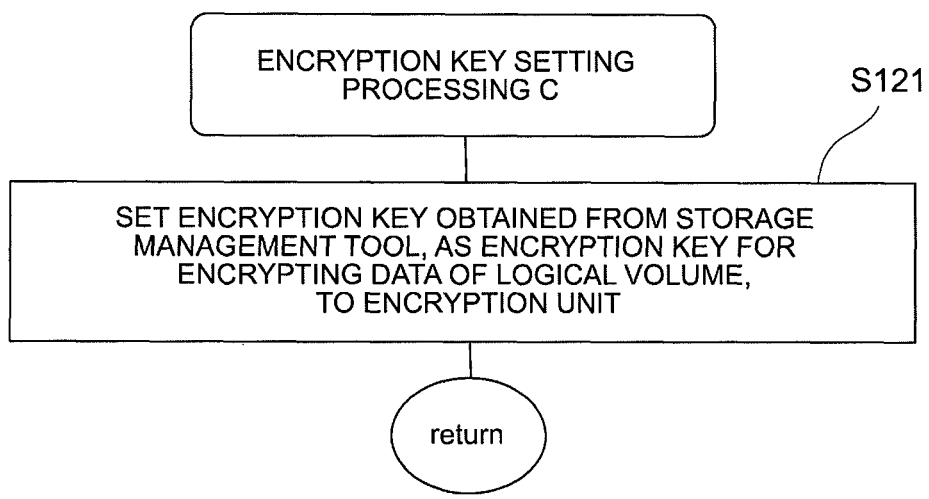
FIG. 26 is a flowchart for explaining encryption key setting processing.

Next, the processing content of the encryption key setting processing will be explained with reference to a flowchart in FIG. 26.

Figure 25:
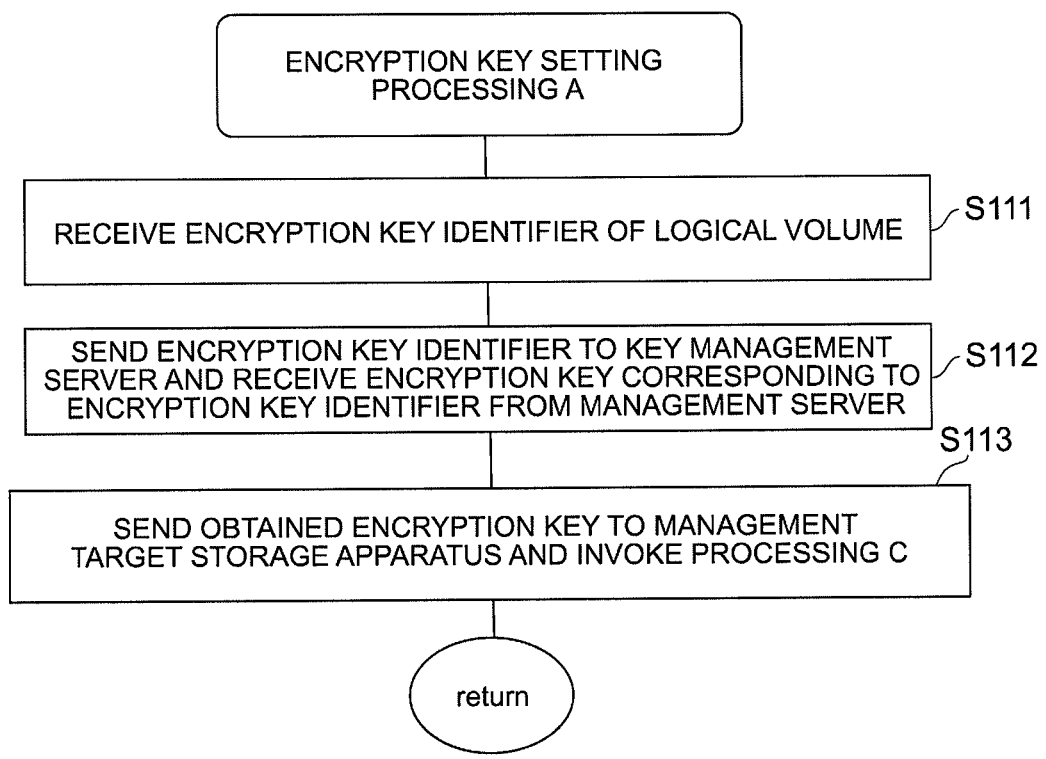
FIG. 25 is a flowchart for explaining encryption key setting processing.

This processing is the processing invoked in step S113 in FIG. 25 and is started by the control program 186.

The control program 186 sets the encryption key "X," which was obtained from the storage management tool 154, to the encryption unit 184 as the encryption key used to encrypt the data of the logical volume 174, which is a processing target (S121); and then returns to the previous processing.

Next, the encryption key reset processing will be explained with reference to a flowchart in FIG. 27.

This processing is the processing invoked in step S104 in FIG. 24 and is started by the storage management tool 152.

The storage management tool 152 initializes the encryption key identifier "0001" of the logical volume 170, which is the migration target, in the logical volume management table 1300 (S131).

Then, the storage management tool 152 invokes encryption key reset processing D to initialize the encryption key "X", which was used to encrypt the data of the logical volume 170, and issues an instruction to the control program 182 to execute the encryption key reset processing D (S132), and then returns to the previous processing.

Figure 28:
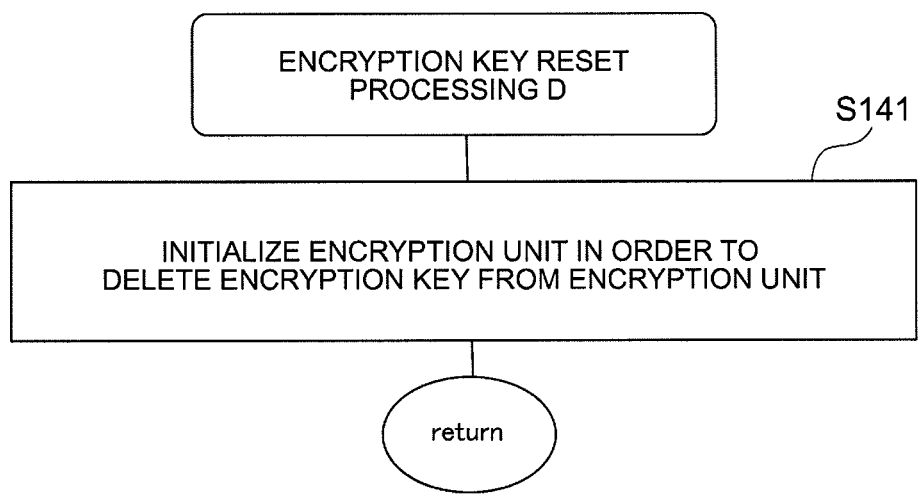
FIG. 28 is a flowchart for explaining encryption key reset processing.

Next, the encryption key reset processing will be explained with reference to a flowchart in FIG. 28.

Figure 27:
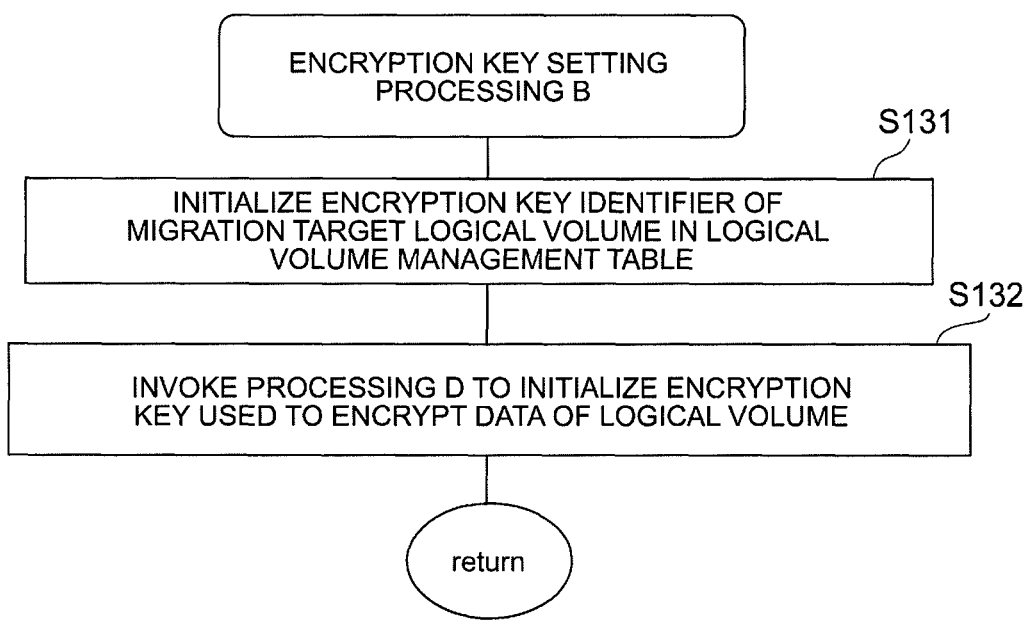
FIG. 27 is a flowchart for explaining encryption key reset processing.

This processing is the processing invoked in step S132 in FIG. 27 and is started by the control program 182.

On condition that the migration of the logical volume 170 has been completed, the control program 182 initializes the encryption key "X," which is set to the encryption unit 180, in order to delete the encryption key "X," which was used to encrypt the data of the logical volume 170, from the encryption unit 180 (S141), and returns to the previous processing.

According to this embodiment, a specific encryption key can be used for each virtual machine as a key for encryption when encrypting the virtual machine 110; and when migrating the virtual machine 110 to another physical machine, the migration destination can take over the encryption key which has been used by the migration source.

(Fourth Embodiment)

This embodiment is configured so that when generating a plurality of virtual machines at a high speed, privacy of information is maintained for each virtual machine, data of a master disk is encrypted with a common key, and difference data obtained by duplicating the data of the master disk is encrypted with an individual key.

Figure 29:
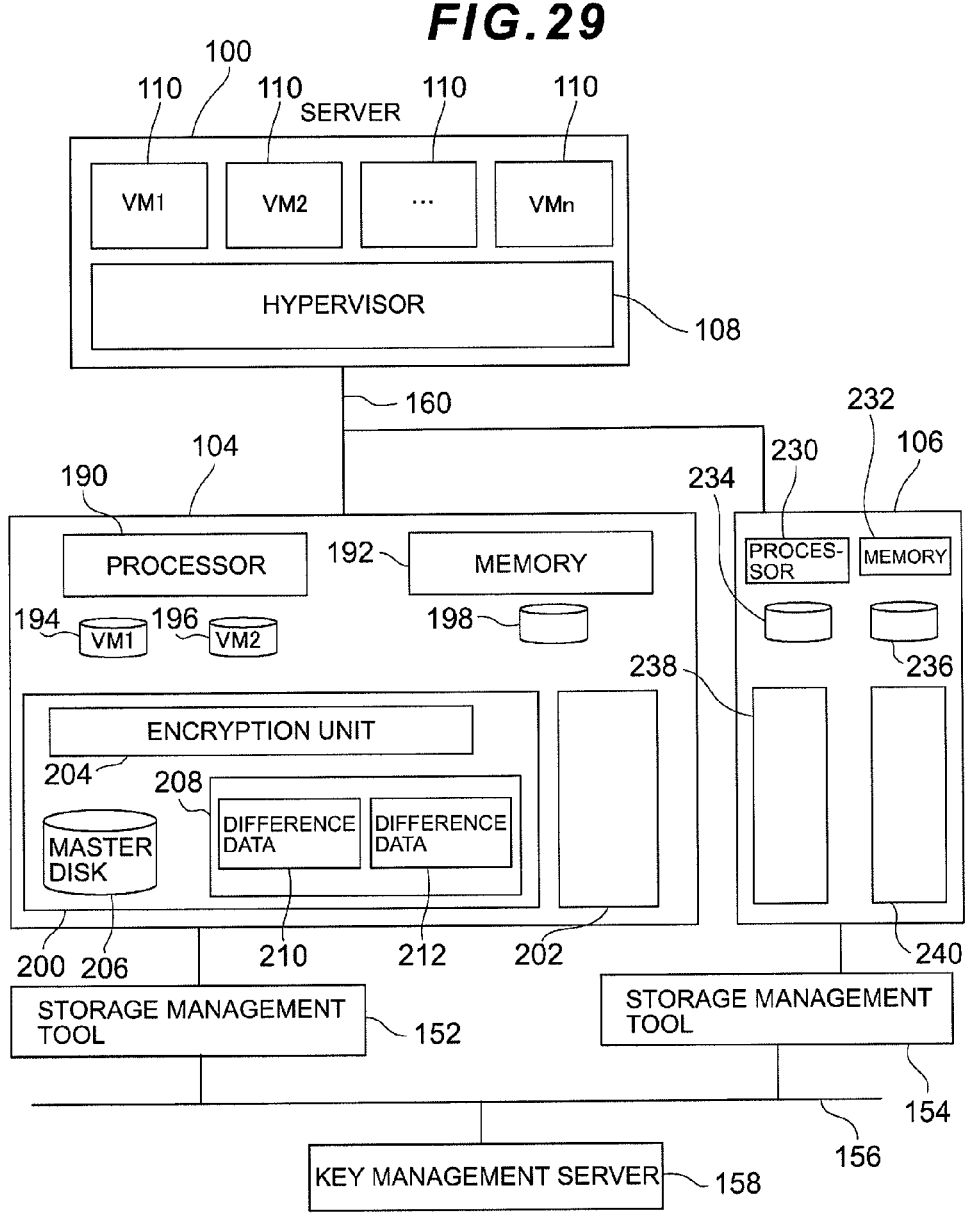
FIG. 29 is a configuration diagram of a computer system according to a fourth embodiment.

FIG. 29 shows a configuration diagram of a computer system according to a fourth embodiment.

Referring to FIG. 29, the computer system is constituted from the server 100, the storage apparatuses 104, 106, the storage management tools 152, 154, and the key management server 158; and the server 100 is connected via a network 160 to the storage apparatus 104, 106, the storage apparatus 104 is connected via the storage management tool 152 to the network 156, the storage apparatus 106 is connected via the storage management tool 154 to the network 156, and the key management server 158 is connected to the network 156.

The configuration of this embodiment is the same as that of the second embodiment or the third embodiment, except that the virtual machine management tool 150 is removed from the computer system and functions different from those of the second embodiment or the third embodiment are added to the storage apparatuses 104, 106.

Specifically speaking, the storage apparatus 104 is constituted from a processor 190, a memory 192, a plurality of logical volumes 194, 196, 198, a storage pool 200 which has the encryption attribute, and a storage pool 202 which does not the encryption attribute.

The processor 190 is configured as a controller for supervising and controlling the entire storage apparatus in accordance with programs stored in the memory 192.

The logical volume 194 is a logical volume which has the encryption attribute, for example, a logical volume to which the virtual machine #1 110 is allocated. The logical volume 196 is a logical volume which has the encryption attribute, for example, a logical volume to which the virtual machine #2 110 is allocated. The logical volume 198 is configured as a logical volume which does not have the encryption attribute.

The storage pool 200 is a pool which has the encryption attribute and is constituted from an encryption unit 204, a master disk 206, and a difference area 208. The storage pool 202 is configured as a pool which does not have the encryption attribute.

The encryption unit 204 is configured as a program for encrypting or decoding data of the master disk 206 or data of the difference area 208. Under this circumstance, the encryption unit 204 encrypts or decodes the data of the master disk 206 by using a common key; and encrypts or decodes a plurality of pieces of difference data of the difference area 208 by using a specific key for each piece of the difference data.

The master disk 206 is a storage area for storing data of the virtual machines 110 as disk images.

The difference area 208 is composed of a plurality of difference data storage areas 210, 212 as storage areas for storing the difference data. The difference data storage area 210 stores, for example, difference data (difference data of the virtual machine #1) obtained by means of snapshots executed when the logical volume 194 is writeaccessed. Furthermore, the difference data storage area 212 stores, for example, difference data (difference data of virtual machine #2) obtained by means of snapshots executed when the logical volume 196 is write-accessed according to a write command.

The storage apparatus 106 is constituted from a processor 230, a memory 232, a plurality of logical volumes 234, 236, a storage pool 238 which has the encryption attribute, and a storage pool 240 which does not have the encryption attribute.

Next, FIG. 30 shows a configuration diagram of a mapping table.

Referring to FIG. 30, a mapping table 1600 is a mapping table of the logical volume 194 corresponding to the virtual machine #1 110; is constituted from a block address field 1602, a storage area category field 1604, a storage area address field 1606, and an encryption key field 1608; and is stored in the memory 192.

The block address is an identifier for identifying a block address added to a read command or a write command. Each entry of the block address field 1602 stores, for example, "0001," "0002," "0003," or "0004" as the identifier for identifying the block address.

The storage area category is information for identifying the master disk 206 or the difference area 208. When data is stored in the master disk 206, each entry of the storage area category field 1604 stores "Master Disk"; and when data is stored in the difference data storage area 210 or the difference data storage area 212 of the difference area 208, each entry of the storage area category field 1604 stores "Difference Area."

The storage area address is an address of an area in which data is stored. Each entry of the storage area address field 1606 stores address information for specifying the master disk 206 or the difference area 208.

For example, when the master disk 206 is to be specified, each entry of the storage area address field 1606 stores "Address Information 1" or "Address Information 4" as the storage area address. Furthermore, when the difference data storage area 210 or the difference data storage area 212 of the difference area 180 is to be specified, each entry of the storage area address field 1606 stores "Address Information 2" or "Address Information 3."

The encryption key is information for specifying an encryption key used to encrypt or decode the data of the master disk 206 or an encryption key used to encrypt or decode the difference data of the difference data storage area 210 or the difference data storage area 212 in the difference area 208.

Each entry of the encryption key field 1608 stores the information for specifying the encryption key used to encrypt or decode the data of the master disk 206 or the encryption key used to encrypt or decode the difference data of the difference data storage area 210 or the difference data storage area 212 in the difference area 208. For example, "Common Key X" is stored as the encryption key to encrypt or decode the data of the master disk 206. Furthermore, "VM1-Specific Key Y" is stored as the encryption key used to encrypt or decode the difference data of the difference data storage area 210 or the difference data storage area 212.

Next, FIG. 31 shows a configuration diagram of another mapping table.

Referring to FIG. 31, a mapping table 1700 is a mapping table of the logical volume 196 corresponding to the virtual machine #2; is constituted from a block address field 1702, a storage area category field 1704, a storage area address field 1706, and an encryption key field 1708; and is stored in the memory 192.

The block address is an identifier for identifying a block address added to a read command or a write command. Each entry of the block address field 1702 stores, for example, "0001," "0002," "0003," or "0004" as the identifier for identifying the block address.

The storage area category is information for identifying the master disk 206 or the difference area 208. When data is stored in the master disk 206, each entry of the storage area category field 1704 stores "Master Disk"; and when data is stored in the difference area 208, each entry of the storage area category field 1704 stores "Difference Area."

The storage area address is an address of an area in which data is stored. Each entry of the storage area address field 1706 stores address information for specifying the master disk 206 or the difference area 208.

For example, when the master disk 206 is to be specified, each entry of the storage area address field 1706 stores "Address Information 1" or "Address Information 6" as the storage area address. Furthermore, when the difference data storage area 210 or the difference data storage area 212 of the difference area 180 is to be specified, each entry of the storage area address field 1706 stores "Address Information 5" or "Address Information 7."

The encryption key is information for specifying an encryption key used to encrypt or decode the data of the master disk 206 or an encryption key used to encrypt or decode the difference data of the difference data storage area 210 or the difference data storage area 212 in the difference area 208.

Each entry of the encryption key field 1708 stores the information for specifying the encryption key used to encrypt or decode the data of the master disk 206 or the encryption key used to encrypt or decode the difference data of the difference data storage area 210 or the difference data storage area 212 in the difference area 208. For example, "Common Key X" is stored as the encryption key to encrypt or decode the data of the master disk 206. Furthermore, "VM2-Specific Key Z" is stored as the encryption key used to encrypt or decode the difference data of the difference data storage area 210 or the difference data storage area 212.

Next, FIG. 32 shows a configuration diagram of an encryption key management table.

Referring to FIG. 32, an encryption key management table 1800 is an encryption key management table corresponding to each virtual machine 110; is constituted from a virtual machine (VM) type field 1802, a virtual machine (VM) identifier field 1804, and an encryption key field 1806; and is located in the key management server 158.

The virtual machine type is information for judging whether the relevant virtual machine 110 is used as a master or as an individual virtual machine. If the virtual machine 110 is used as the master, the relevant entry of the virtual machine type field 1802 stores "Master"; and if the virtual machine 110 is used an individual virtual machine, the relevant entry of the virtual machine type field 1802 stores "Individual."

The virtual machine identifier is an identifier for uniquely identifying the virtual machine 110. Each entry of the virtual machine identifier field 1804 stores, for example, "A000," "A001," or "A002" as the identifier for identifying each virtual machine 110.

The encryption key is information about the encryption key used for the virtual machine 110. If the virtual machine 110 is used as the master, each entry of the encryption key field 1806 stores, for example, "X." Furthermore, if the virtual machine 110 is used as an individual virtual machine, each entry of the encryption key field 1806 stores "Y" or "Z."

Figure 33:
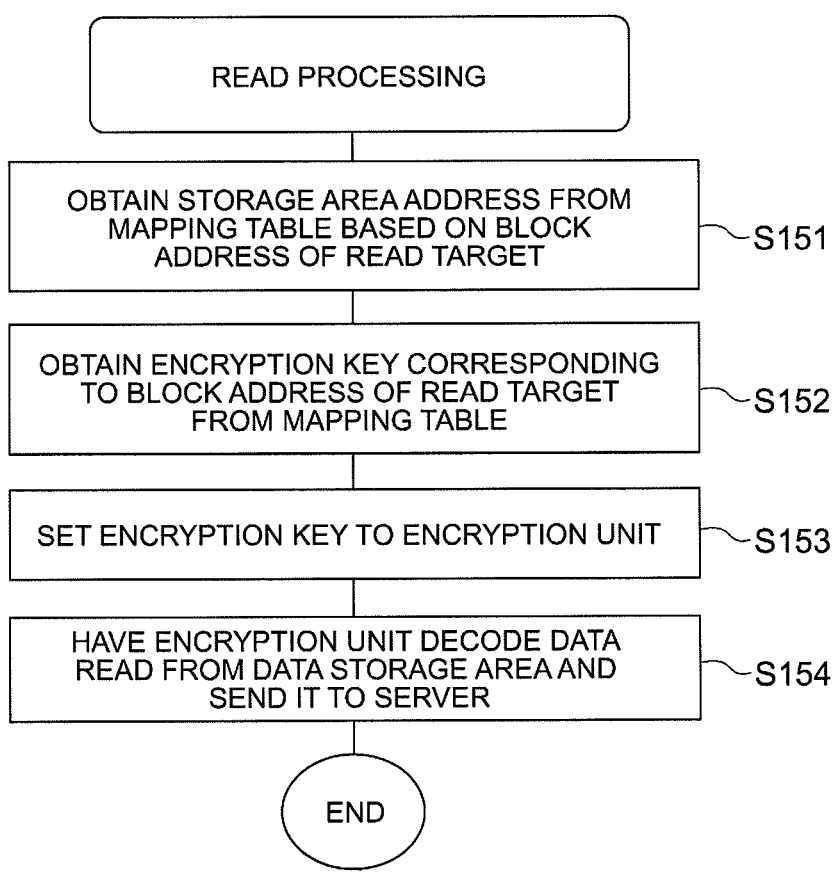
FIG. 33 is a flowchart for explaining read processing on a virtual machine.

Next, read processing according to this embodiment will be explained with reference to a flowchart in FIG. 33.

This processing is read processing on the virtual machine #1 110 and is started by the processor 190 when the processor 190 receives a read command issued from the server 100.

The processor 190 refers to the mapping table 1600 of the logical volume 194 based on the block address of a read target, which is added to the read command, and obtains the storage area address (S151). For example, if "0001" is added as the block address to the read command, the processor 190 obtains "Address Information 1" as the storage area address from the mapping table 1600 of the logical volume 194.

Furthermore, if the block address is "0002," the processor 190 obtains "Address Information 2" as the storage area address from the mapping table 1600 of the logical volume 194.

Next, the processor 190 obtains the encryption key corresponding to the block address of the read target from the mapping table 1600 (S152). For example, if the block address is "0001," the processor 190 obtains "Common Key X" as the encryption key; and if the block address is "0002," the processor 190 obtains "VM1-Specific Key Y" as the encryption key.

Then, the processor 190 sets the obtained encryption key to the encryption unit 204 (S153).

Subsequently, the processor 190 reads data from a data storage area, for example, the master disk 206 or the difference area 208, has the encryption unit 204 decode the read data, sends the decoded data to the server 100 (S154), and then terminates the processing in this routine.

If data is read from the master disk 206 in this case, the data is decoded by using "Common Key X"; and if the data is read as the difference data from the difference data storage area 210 or the difference data storage area 212 in the difference area 208, the data is decoded by using "VM1-Specific Key Y."

Figure 34:
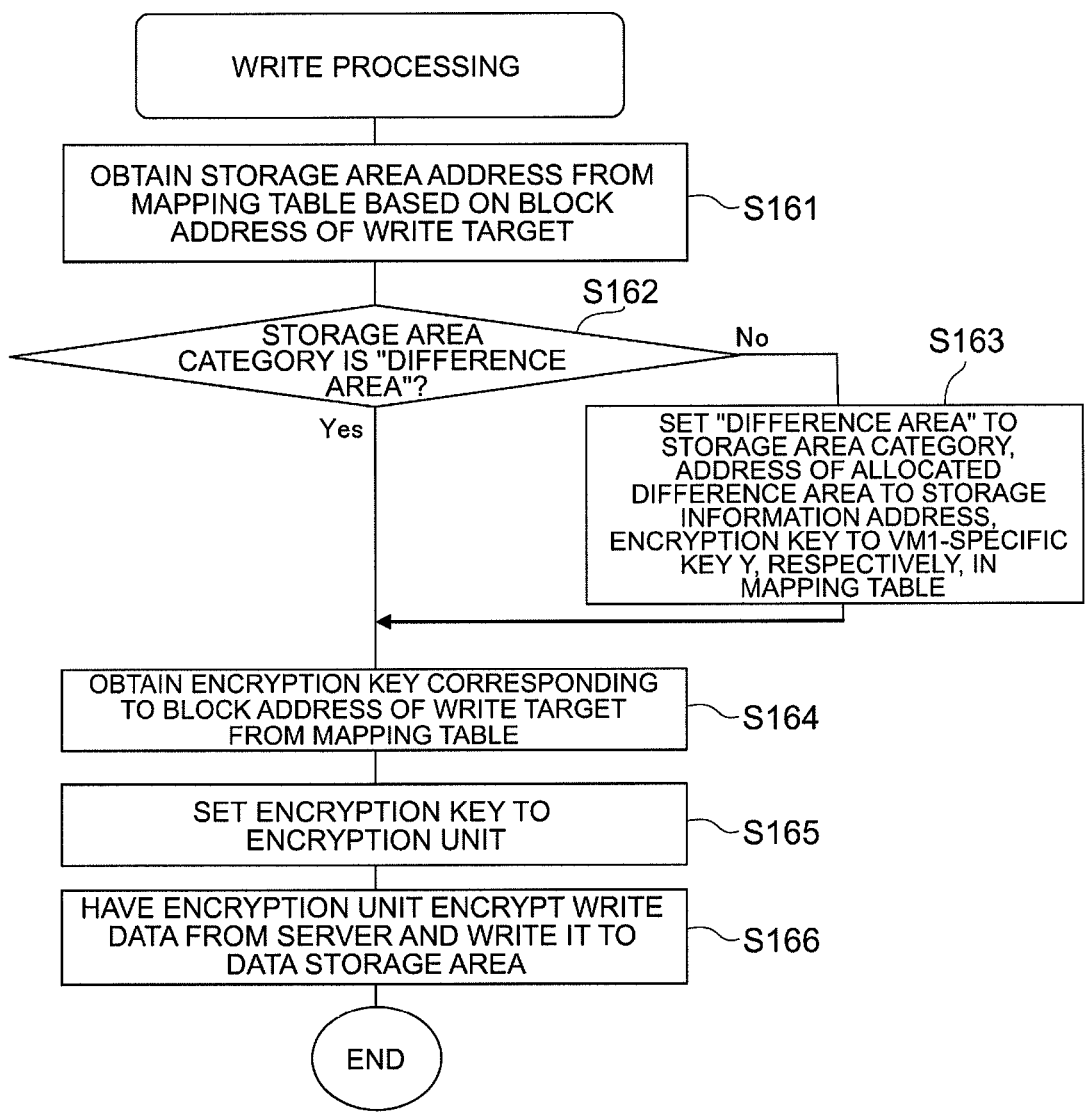
FIG. 34 is a flowchart for explaining write processing on a virtual machine.

Next, write processing according to this embodiment will be explained with reference to a flowchart in FIG. 34.

This processing is write processing on the virtual machine #1 110 and is started by the processor 190 when the processor 190 receives a write command issued from the server 100.

When the processor 190 receives the write command from the server100, it refers to the mapping table 1600 based on the block address of a write target, which is added to the write command, and obtains the storage area address (S161).

Next, the processor 190 judges whether the storage category area is the difference area or not, based on the obtained storage area address (S162).

If a negative judgment is returned in step S162, the processor 190 allocates the difference area 208 to a write target block, sets the difference area to the storage area category of the mapping table 1600, sets the address information of the difference area, which is allocated to the storage area category, to the storage area address, and sets "VM1-Specific Key Y" to the encryption key in order to prevent the data of the master disk 206 from being updated (S163).

If an affirmative judgment is returned in step S162, or after the processing in step S162, the processor 190 obtains the encryption key corresponding to the block address of the write target from the mapping table 1600 (S164).

Next, the processor 190 sets "VM1-Specific Key Y" as the obtained encryption key to the encryption unit 204 (S165).

Then, the processor 190 has the encryption unit 204 encrypt the write data sent from the server 100 by using "VM1-Specific Key Y" as the encryption key, writes the encrypted write data to the difference area 208 (S166) and then terminates the processing in this routine.

In this embodiment, the master disk 206 for storing the master data is constructed as a first area in the storage pool 200; the difference area 208 for storing the difference data obtained by duplicating the master data is constructed as a second area. When receiving a command from the server 100 which is an access requestor, the processor 190 refers to the mapping table 1600 based the block address (logical address) attached to the command; and on condition that the master disk 206 is the access target, the processor 190 encrypts or decodes the data of the master disk 206 by using the common key S; and on condition that the difference area 208 is the access target, the processor 190 encrypts or decodes the difference data by using the specific key Y.

When generating a plurality of virtual machines 110 at a high speed according to this embodiment, the data of the master disk 206 can be encrypted by using the common key and the difference data of the difference area 208 can be encrypted by using the individual specific key.

Incidentally, the present invention is not limited to the aforementioned embodiments, and includes various variations. For example, the aforementioned embodiments have been described in detail in order to explain the invention in an easily comprehensible manner and are not necessarily limited to those having all the configurations explained above. Furthermore, part of the configuration of a certain embodiment can be replaced with the configuration of another embodiment and the configuration of another embodiment can be added to the configuration of a certain embodiment. Also, part of the configuration of each embodiment can be deleted, or added to, or replaced with, the configuration of another configuration.

Furthermore, part or all of the aforementioned configurations, functions, processing units, processing means, and so on may be realized by hardware by, for example, designing them in integrated circuits. Also, each of the aforementioned configurations, functions, and so on may be realized by software by processors interpreting and executing programs for realizing each of the functions. Information such as programs, tables, and files for realizing each of the functions may be recorded and retained in memories, storage devices such as hard disks and SSDs (Solid State Drives), or storage media such as IC (Integrated Circuit) cards, SD (Secure Digital) memory cards, and DVDs (Digital Versatile Discs).

REFERENCE SIGNS LIST

10 Storage system
14 Host computer
26, 28 Logical volume
30, 32 Storage pool
16, 18 Storage devices
50 Storage apparatus
52 Storage management tool
62 Channel adapter
64 Disk adapter
68 Shared memory
100 Server
104, 106 Storage apparatus
110 Virtual machine
120, 130 Controller
126, 128, 136, 138 Storage pool
150 Virtual machine management tool
152, 154 Storage management tool
158 Key management server
180, 184 Encryption unit
190 Processor
192 Memory
200, 202 Storage pool
204 Encryption unit
206 Master disk
208 Difference area
230 Processor
232 Memory
238, 240 Storage pool

The invention claimed is:

1. A storage system comprising one or more storage apparatuses, each of which includes:
a plurality of storage devices with different functions; and
a controller for controlling the plurality of storage devices;
wherein the controller belonging to the one or more storage apparatuses:
manages a first storage pool, which is a pool composed of a first physical volume and defined as a pool having a first attribute, and a second storage pool, which is a pool composed of a second physical volume and defined as a pool having a second attribute, by using attribute information for specifying the first attribute or the second attribute;
manages a plurality of logical volumes, which are access targets of an access requestor, by associating them with the first storage pool or the second storage pool;
divides the plurality of storage devices into a first storage device and a second storage device according to the functions and manages the first storage device and the second storage device by associating them with function information for specifying the functions;
determines a physical volume to be allocated to the first storage pool or the second storage pool on the basis of the attribute information and the function information when allocating a physical volume to each of the first storage pool and the second storage pool;
defines the first storage pool as a pool, which is composed of the first physical volume having an encryption function and has an encryption attribute, defines the second storage pool as a pool, which is composed of the second physical volume not having the encryption function and does not have the encryption attribute, and manages the defined first storage pool and the defined second storage pool by associating them with encryption attribute information indicating whether the encryption attribute exists or not;
divides the plurality of logical volumes which are access targets of the access requestor, into a first logical volume, to which the first physical volume belonging to the first storage pool is allocated and which is defined as a logical volume having the encryption attribute, and a second logical volume, to which the second physical volume belonging to the second storage pool is allocated and which is defined as a logical volume not having the encryption attribute, and manages the first logical volume and the second logical volume by associating them with the encryption attribute information indicating whether the encryption attribute exists or not;

divides the plurality of storage devices into the first storage device, which has the encryption function, and the second storage device, which does not have the encryption function, and manages the first storage device and the second storage device by associating them with encryption function information indicating whether the function exists or not; and when allocating a physical volume to each of the first storage pool and the second storage pool, to the encryption attribute information and the encryption function information and allocates a physical storage area of the first storage device as the first physical volume to the first storage pool and a physical storage area of the second storage device as the second physical volume to the second storage pool on a basis of a reference result.

2. The storage system according to claim 1, wherein the controller belonging to the one or more storage apparatuses divides the plurality of logical volumes, which are access targets of the access requestor, into the first logical volume, to which the first physical volume belonging to the first storage pool is allocated and which is defined as a logical volume having the first attribute, and the second logical volume, to which the second physical volume belonging to the second storage pool is allocated and which is defined as a logical volume having the second attribute, and manages the first logical volume and the second logical volume by associating them with the attribute information for specifying the first attribute or the second attribute.

3. The storage system according to claim 1, wherein the controller belonging to the one or more storage apparatuses divides the plurality of logical volumes, which are access targets of the access requestor, into the first logical volume, to which the first physical volume belonging to the first storage pool is allocated and which is defined as a logical volume having the encryption attribute, and the second logical volume, to which the second physical volume belonging to the second storage pool is allocated and which is defined as a logical volume not having the encryption attribute, and manages the first logical volume and the second logical volume by associating them with encryption attribute information indicating whether the encryption attribute exists or not.

4. The storage system according to claim 1, wherein each controller which has a management tool for sending information to, and receiving information from, the plurality of storage apparatuses and managing migration executed between the plurality of storage apparatuses, and belongs to the plurality of storage apparatuses:

manages a migration target, which is a target of the migration, by using migration target management information including a storage identifier for identifying each storage apparatus and a policy for specifying the function of each storage device; and manages the plurality of logical volumes by using logical volume management information including an attribute of each logical volume corresponding to each policy and an allocation status with respect to the plurality of logical volumes; and wherein the management tool refers to logical volume management information managed by a migration destination storage apparatus based on the policy in the migration target management information of the migration target belonging to a migration source storage apparatus; and if it is determined based on the reference result that a logical volume whose attribute matches the policy and which is not allocated exists among the plurality of logical volumes belonging to the migration destination storage apparatus, the management tool manages the logical volume, whose attribute matches the policy and which is not allocated, as a logical volume of the migration destination storage apparatus.

5. The storage system according to claim 1, wherein each controller which has a management tool for sending information to, and receiving information from, the plurality of storage apparatuses and managing migration executed between the plurality of storage apparatuses, and belongs to the plurality of storage apparatuses manages the plurality of logical volumes by using logical volume management information including an attribute of each logical volume corresponding to each policy, an allocation status with respect to the plurality of logical volumes, and an identifier of an encryption key;

wherein before executing processing of the migration, the management tool receives the encryption key identifier of a logical volume, which is the migration target, from a controller belonging to the migration source storage apparatus and sends the received encryption key identifier to a controller belonging to the migration destination storage apparatus; and wherein if the controller belonging to the migration destination storage apparatus sends the encryption key identifier received from the management tool to a management server for managing a relationship between the encryption key identifier allocated to each logical volume and the encryption key and receives the encryption key corresponding to the sent encryption key identifier from the management server, the controller manages the received encryption key as an encryption key for encrypting data of the logical volume migrated from the migration source storage apparatus.

6. The storage system according to claim 1, wherein the controller belonging to the one or more storage apparatuses defines the first storage pool as a pool, which is composed of a first physical volume having an encryption function and has an encryption attribute, defines the second storage pool as a pool, which is composed of a second physical volume not having the encryption function and does not have the encryption attribute, constructs a first area for storing master data and a second area for storing difference data obtained by duplicating the master data, in the defined first storage pool, and manages a common key indicating an encryption key for encrypting or decoding the master data and a specific key indicating an encryption key for encrypting or decoding the difference data, using a mapping table by associating them with a logical address attached to a command from the access requestor; and wherein when the controller belonging to the one or more storage apparatuses receives the command from the access requestor, it refers to the mapping table based on the logical address attached to the command; and the controller encrypts or decodes the master data by using the common key on condition that the first area is the access target; and the controller encrypts or decodes the difference data by using the specific key on condition that the second area is the access target.

7. A method for managing a storage system equipped with one or more storage apparatuses, each of which includes:

a plurality of storage devices with different functions; and
a controller for controlling the plurality of storage devices;
wherein the storage system management method comprises:

a step executed by the controller belonging to the one or more storage apparatuses managing a first storage pool, which is a pool composed of a first physical volume and defined as a pool having a first attribute, and a second storage pool, which is a pool composed of a second physical volume and defined as a pool having a second attribute, by using attribute information for specifying the first attribute or the second attribute;

a step executed by the controller belonging to the one or more storage apparatuses managing a plurality of logical volumes, which are access targets of an access requestor, by associating them with the first storage pool or the second storage pool;

a step executed by the controller belonging to the one or more storage apparatuses dividing the plurality of storage devices into a first storage device and a second storage device according to the functions and managing the first storage device and the second storage device by associating them with function information for specifying the functions;

a step executed by the controller belonging to the one or more storage apparatuses determining a physical volume to be allocated to the first storage pool or the second storage pool on the basis of the attribute information and the function information when allocating a physical volume to each of the first storage pool and the second storage pool;

a step executed by the controller belonging to the one or more storage apparatuses defining the first storage pool as a pool which is composed of the first physical volume having an encryption function and has an encryption attribute, defining the second storage pool as a pool, which is composed of the second volume not having the encryption function and does not have the encryption attribute, and managing the defined first storage pool and the defined second storage pool by associating them with encryption attribute information indicating whether the encryption attribute exists or not;

a step executed by the controller belonging to the one or more storage apparatuses dividing the plurality of logical volumes, which are access targets of the access requestor, into a first logical volume to which the first physical volume belonging to the first storage pool is allocated and which is defined as a logical volume having the encryption attribute, and a second logical volume, to which the second physical volume belonging to the second storage pool is allocated and which is defined as a logical volume not having the encryption attribute, and managing the first logical volume and the second logical volume by associating them with the encryption attribute information indicating whether the encryption attribute exists or not;

a step executed by the controller belonging to the one or more storage apparatuses dividing the plurality of storage devices into the first storage device, which has the encryption function, and the second storage device, which does not have the encryption function, and managing the first storage device and the second storage device by associating them with encryption function information indicating whether the encryption function exists or not; and a step executed, when allocating a physical volume to each of the first storage pool and the second storage pool, by the controller belonging to the one or more storage apparatuses referring to the encryption attribute information and the encryption function information and allocating a physical storage area of the first storage device as the first physical volume to the first storage pool and a physical storage area of the second storage device as the second physical volume to the second storage pool on a basis of a reference result.

8. The storage system management method according to claim 7, wherein the controller belonging to the one or more storage apparatuses divides the plurality of logical volumes, which are access targets of the access requestor, into the first logical volume, to which the first physical volume belonging to the first storage pool is allocated and which is defined as a logical volume having the first attribute, and the second logical volume, to which the second physical volume belonging to the second storage pool is allocated and which is defined as a logical volume having the second attribute, and manages the first logical volume and the second logical volume by associating them with the attribute information for specifying the first attribute or the second attribute.

9. The storage system management method according to claim 7, wherein the controller belonging to the one or more storage apparatuses divides the plurality of logical volumes, which are access targets of the access requestor, into the first logical volume, to which the first physical volume belonging to the first storage pool is allocated and which is defined as a logical volume having the encryption attribute, and the second logical volume, to which the second physical volume belonging to the second storage pool is allocated and which is defined as a logical volume not having the encryption attribute, and manages the first logical volume and the second logical volume by associating them with encryption attribute information indicating whether the encryption attribute exists or not.

10. The storage system management method according to claim 7, further comprising:

a step executed by each controller belonging to the plurality of storage apparatuses managing a migration target, which is a target of the migration, by using migration target management information including a storage identifier for identifying each storage apparatus and a policy for specifying the function of each storage device; and a step executed by each controller belonging to the plurality of storage apparatuses managing the plurality of logical volumes by using logical volume management information including an attribute of each logical volume corresponding to each policy and an allocation status with respect to the plurality of logical volumes;

a step executed by a management tool for sending information to, and receiving information from, the plurality of storage apparatuses and managing migration executed between the plurality of storage apparatuses referring to logical volume management information managed by a migration destination storage apparatus based on the policy in the migration target management information of the migration target belonging to a migration source storage apparatus; and a step executed, if it is determined based on the reference result that a logical volume whose attribute matches the policy and which is not allocated exists among the plurality of logical volumes belonging to the migration destination storage apparatus, by the management tool managing the logical volume, whose attribute matches the policy and which is not allocated, as a logical volume of the migration destination storage apparatus.

11. The storage system management method according to claim 7, further comprising:

a step executed by each controller belonging to the plurality of storage apparatuses managing the plurality of logical volumes by using logical volume management information including an attribute of each logical volume corresponding to each policy, an allocation status with respect to the plurality of logical volumes, and an identifier of an encryption key;

a step executed, before execution of processing of the migration, by a management tool for sending information to, and receiving information from, the plurality of storage apparatuses and managing migration executed between the plurality of storage apparatuses receiving the encryption key identifier of a logical volume, which is the migration target, from a controller belonging to the migration source storage apparatus and sending the received encryption key identifier to a controller belonging to the migration destination storage apparatus;

a step executed by the controller belonging to the migration destination storage apparatus sending the encryption key identifier received from the management tool to a management server for managing a relationship between the encryption key identifier allocated to each logical volume and the encryption key; and a step executed, when receiving the encryption key corresponding to the sent encryption key identifier from the management server, by the controller belonging to the migration destination storage apparatus managing the received encryption key as an encryption key for encrypting data of the logical volume migrated from the migration source storage apparatus.

12. The storage system management method according to claim 7, further comprising:

a step executed by the controller belonging to the one or more storage apparatuses defining the first storage pool as a pool, which is composed of a first physical volume having an encryption function and has an encryption attribute, and defining the second storage pool as a pool, which is composed of a second physical volume not having the encryption function and does not have the encryption attribute;

a step executed by the controller belonging to the one or more storage apparatuses constructing a first area for storing master data and a second area for storing difference data obtained by duplicating the master data, in the defined first storage pool;

a step executed by the controller belonging to the one or more storage apparatuses managing a common key indicating an encryption key for encrypting or decoding the master data and a specific key indicating an encryption key for encrypting or decoding the difference data, using a mapping table by associating them with a logical address attached to a command from the access requestor; and a step executed, when the controller belonging to the one or more storage apparatuses receives the command from the access requestor, by the controller belonging to the one or more storage apparatuses referring to the mapping table based on the logical address attached to the command, encrypting or decoding the master data by using the common key on condition that the first area is the access target, and encrypting or decoding the difference data by using the specific key on condition that the second area is the access target.

\* \* \* \* \*